C. BURNHAM.
BOX MAKING MACHINE.
APPLICATION FILED NOV. 29, 1912.
1,119,341.
Patented Dec. 1, 1914.
15 SHEETS—SHEET 1.
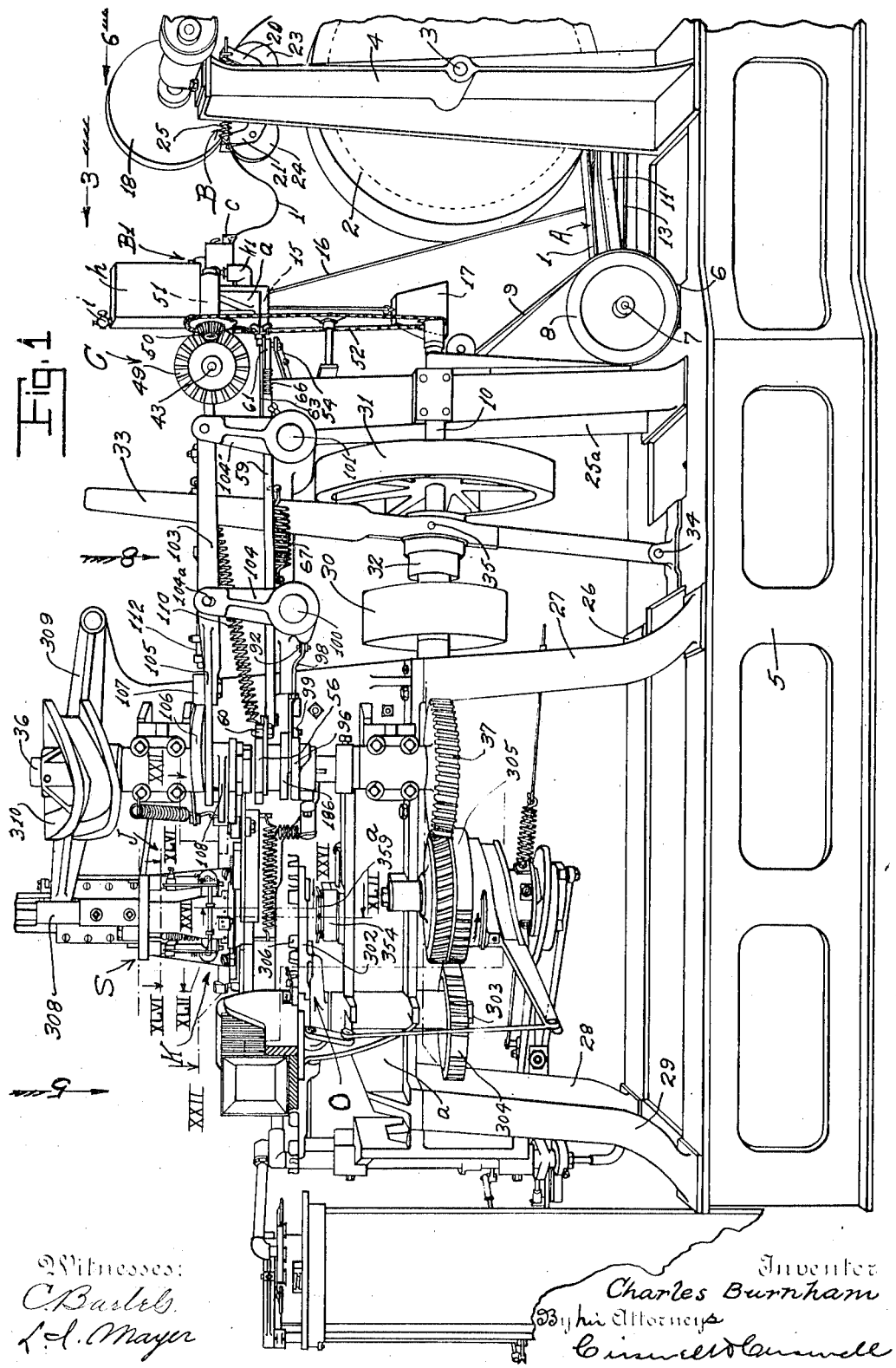
Witnesses:
C. Bartels
J. A. Mayer
Inventor
Charles Burnham
By his Attorneys
Connell & Connell

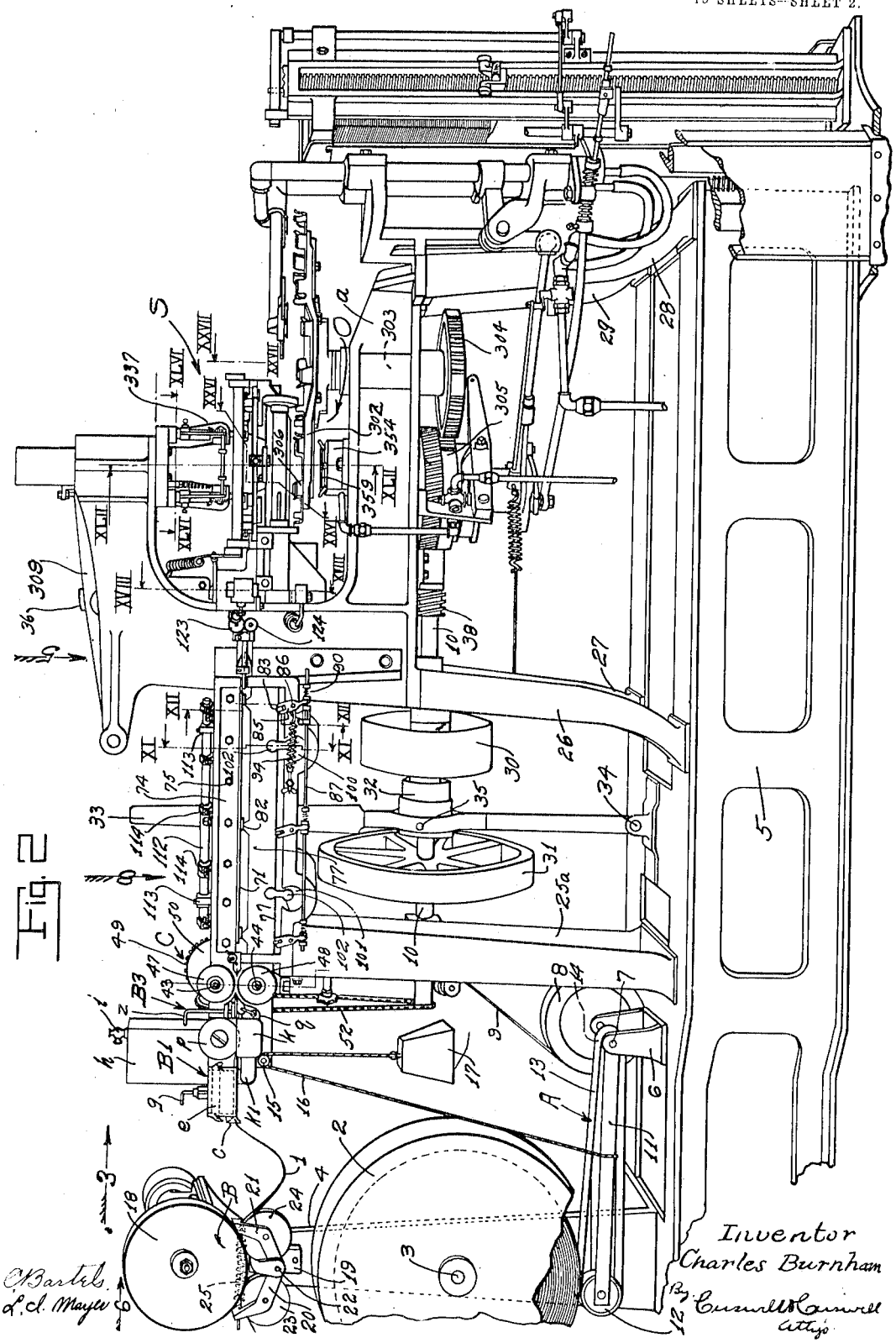

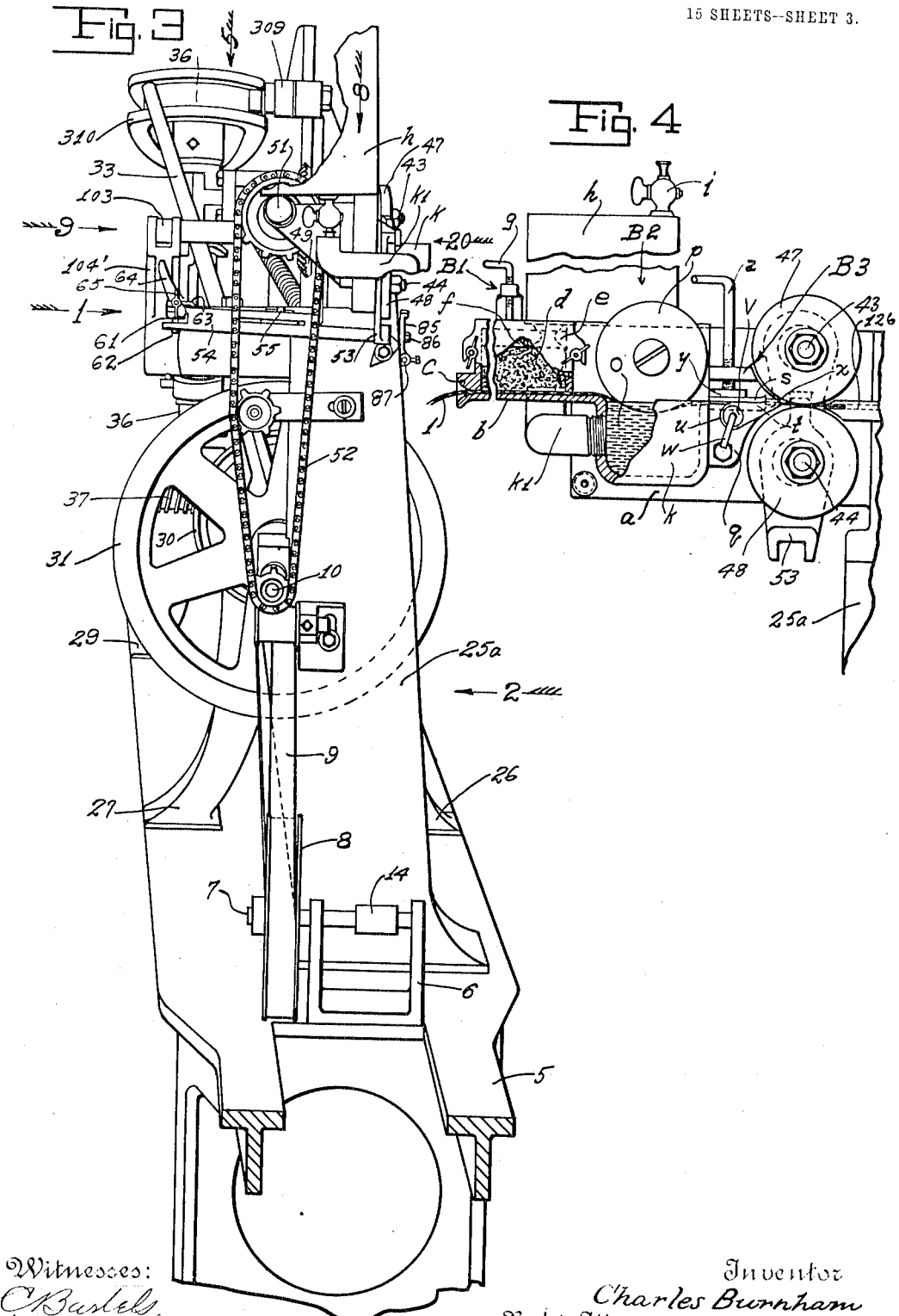

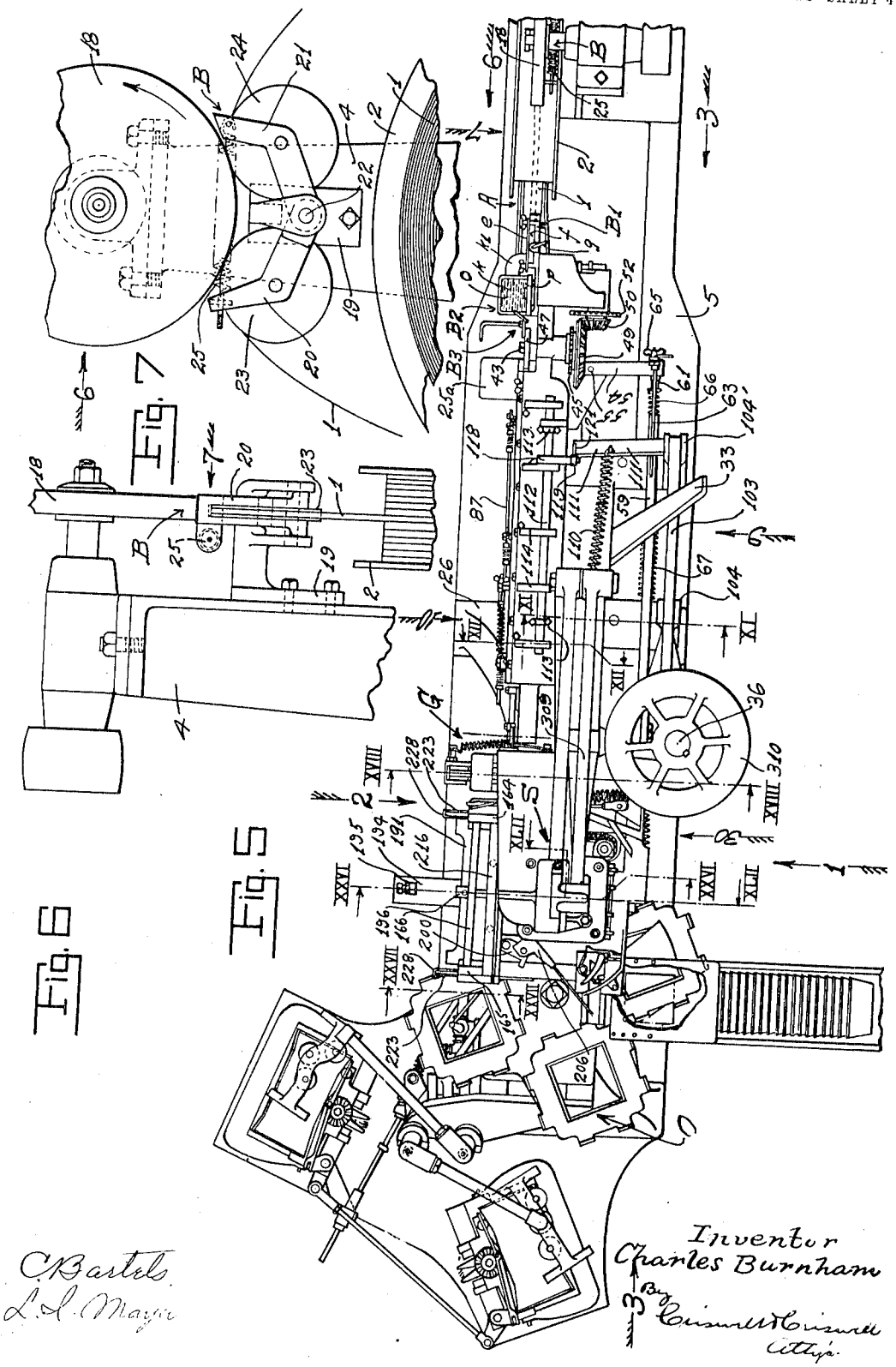

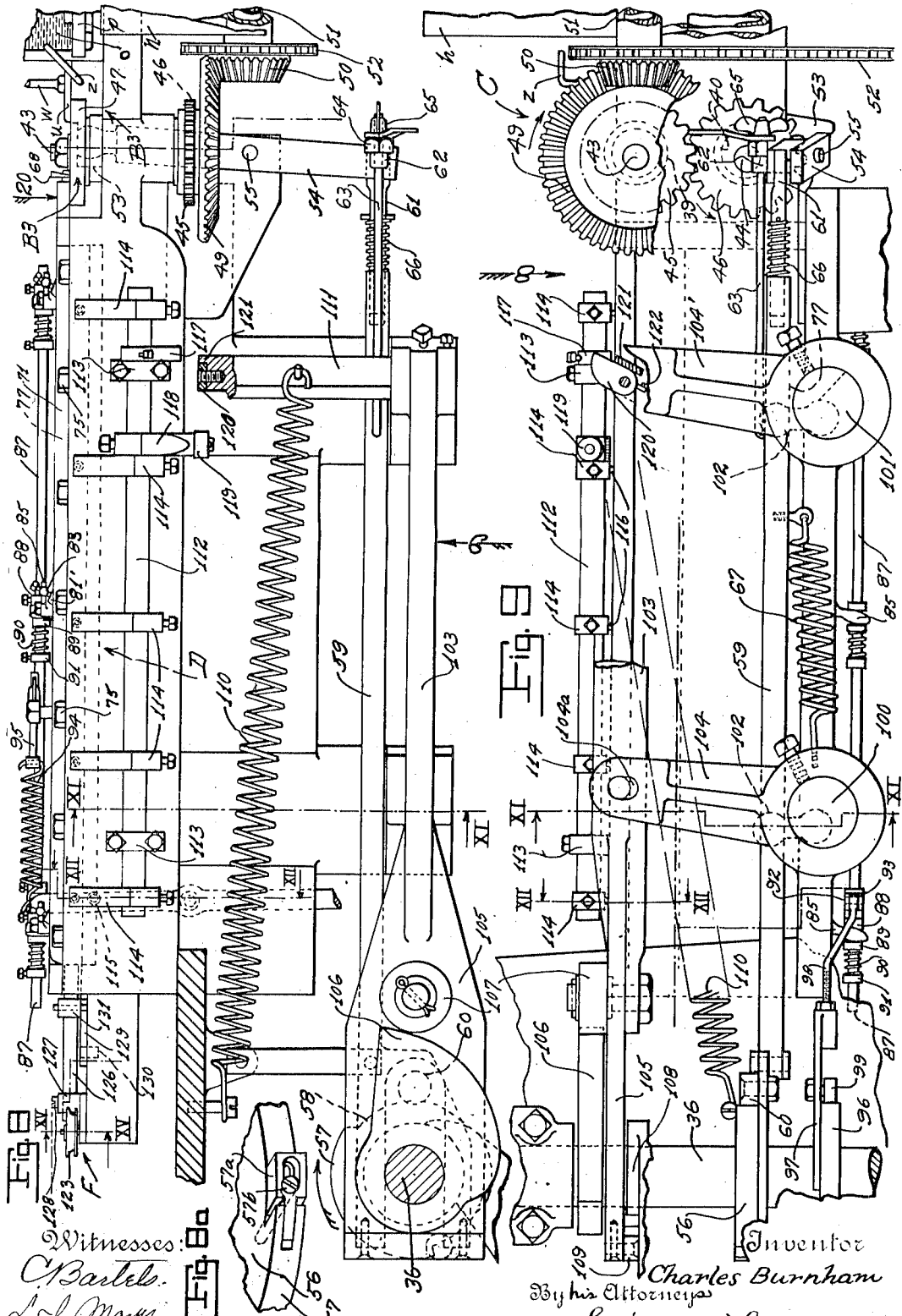

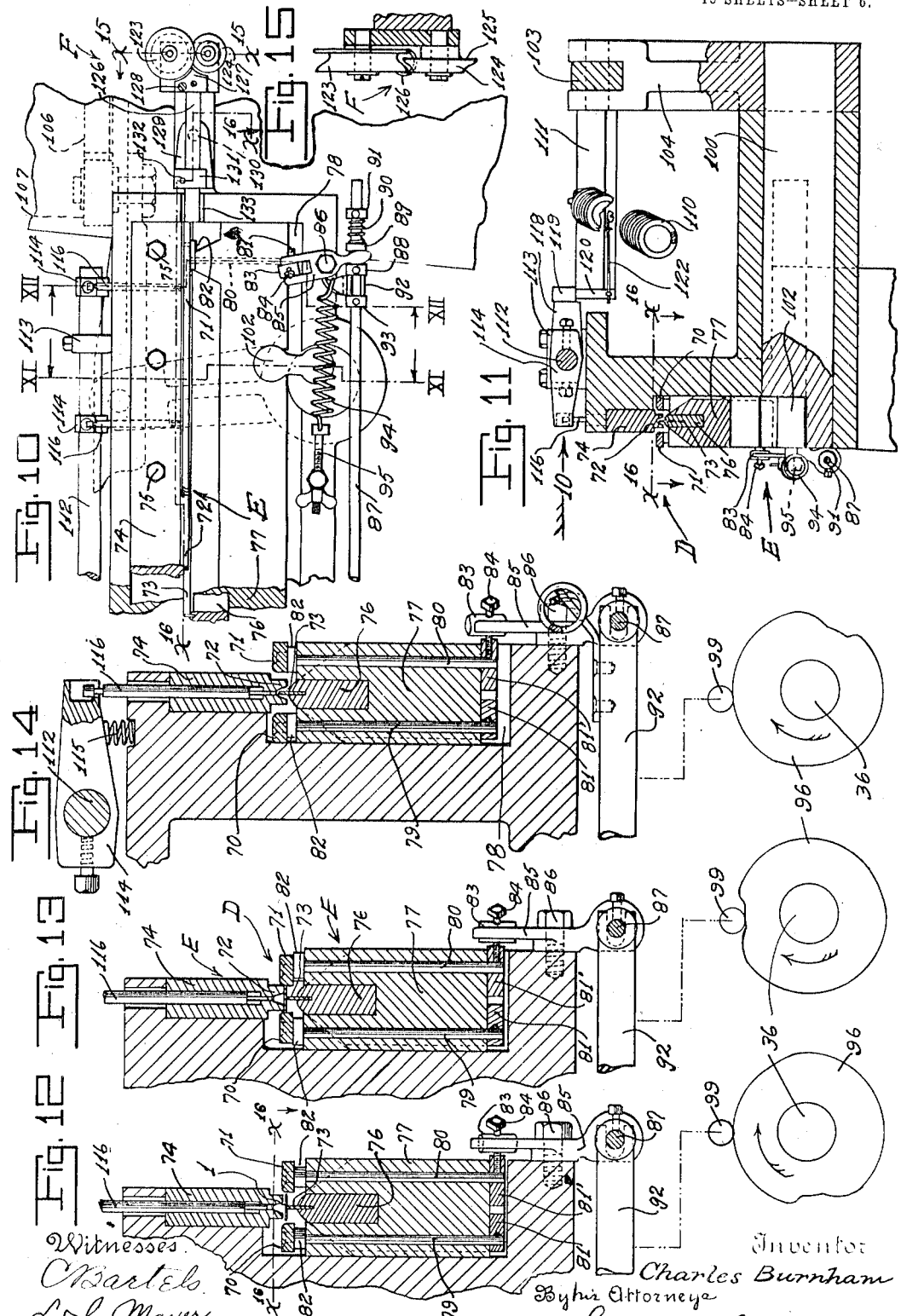

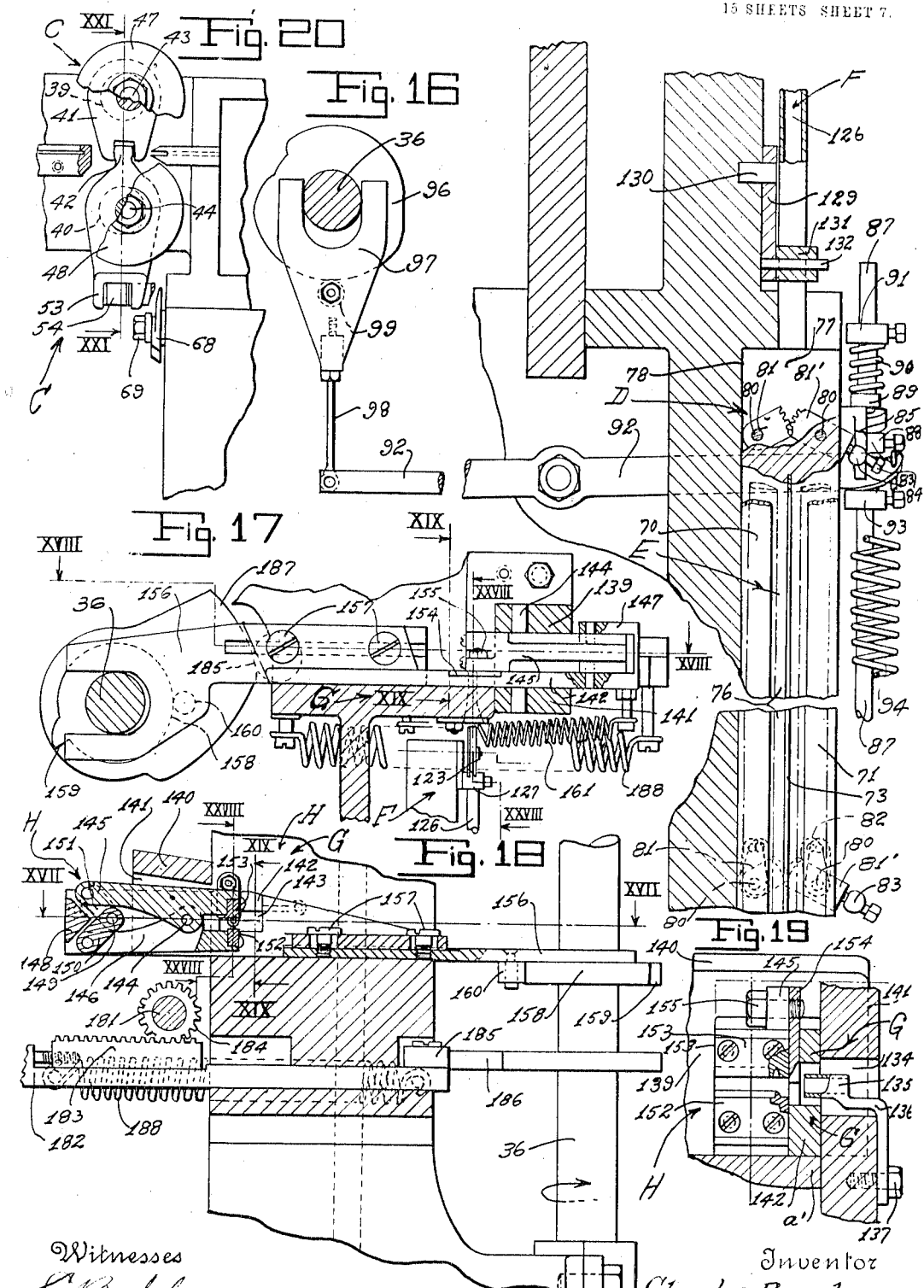

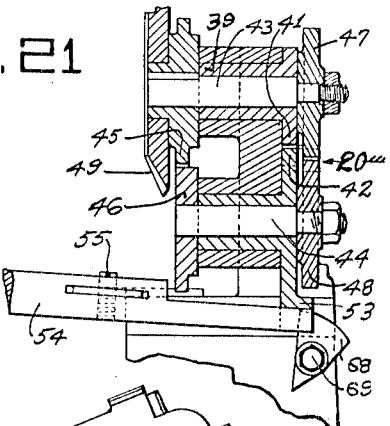

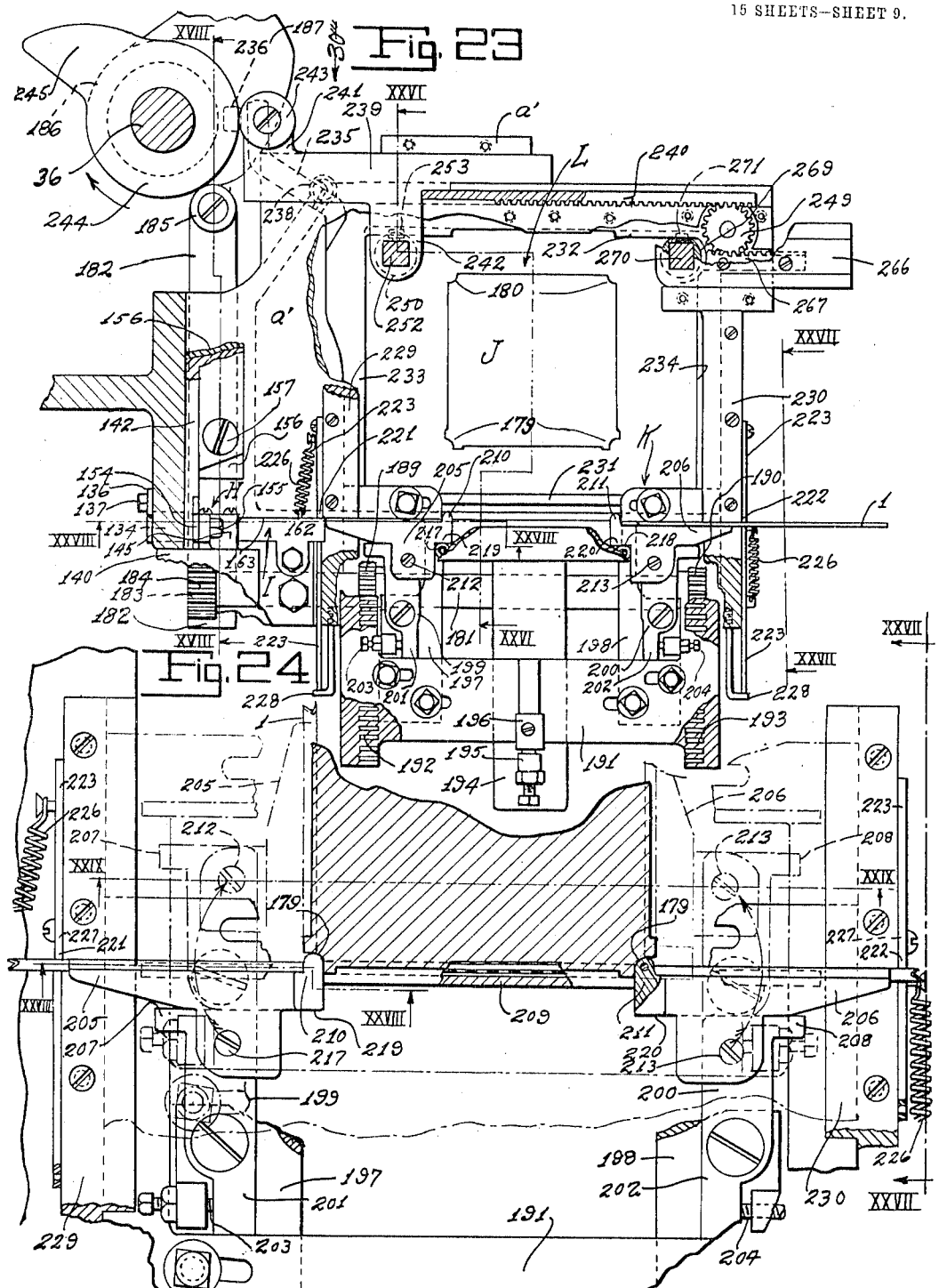

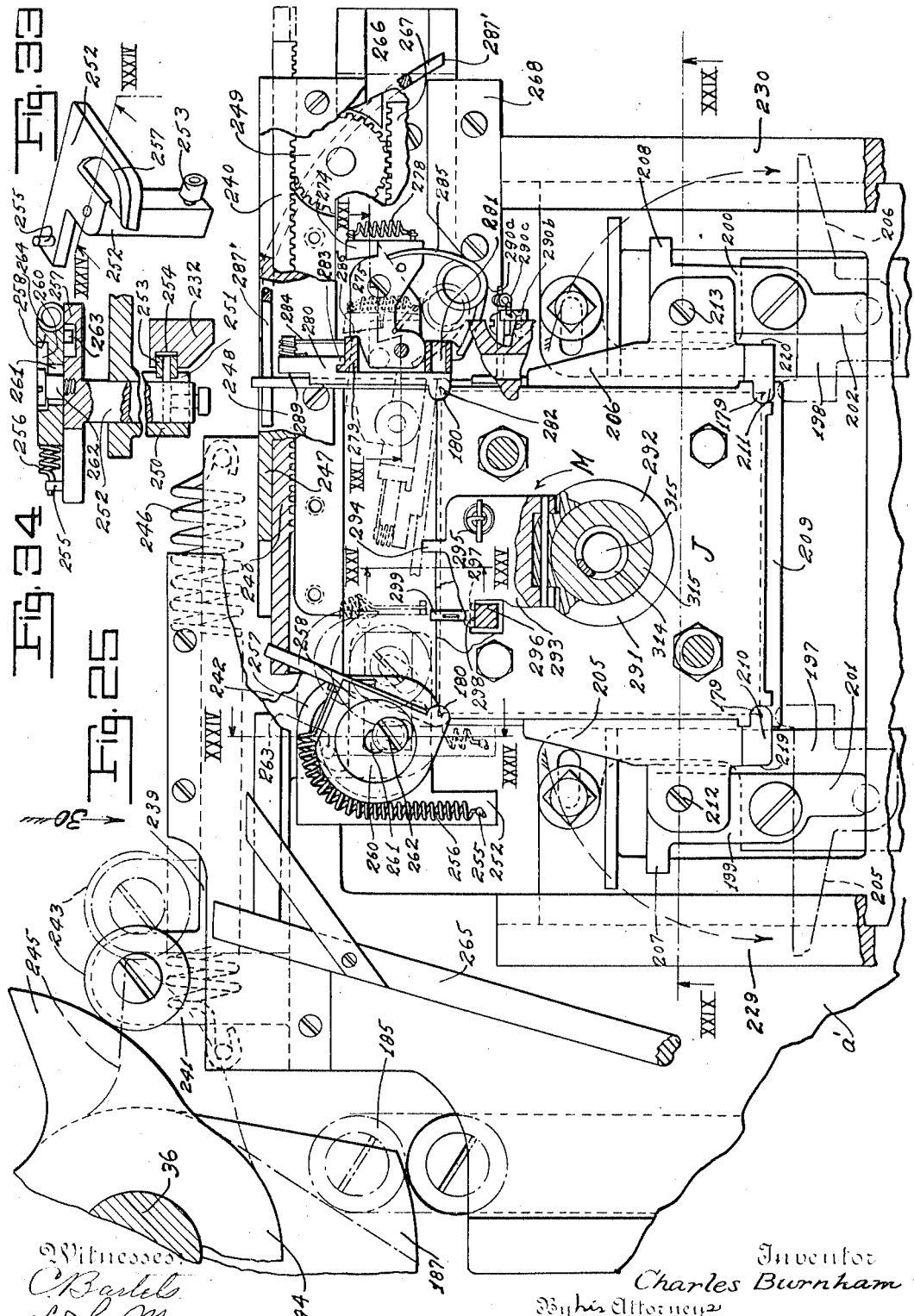

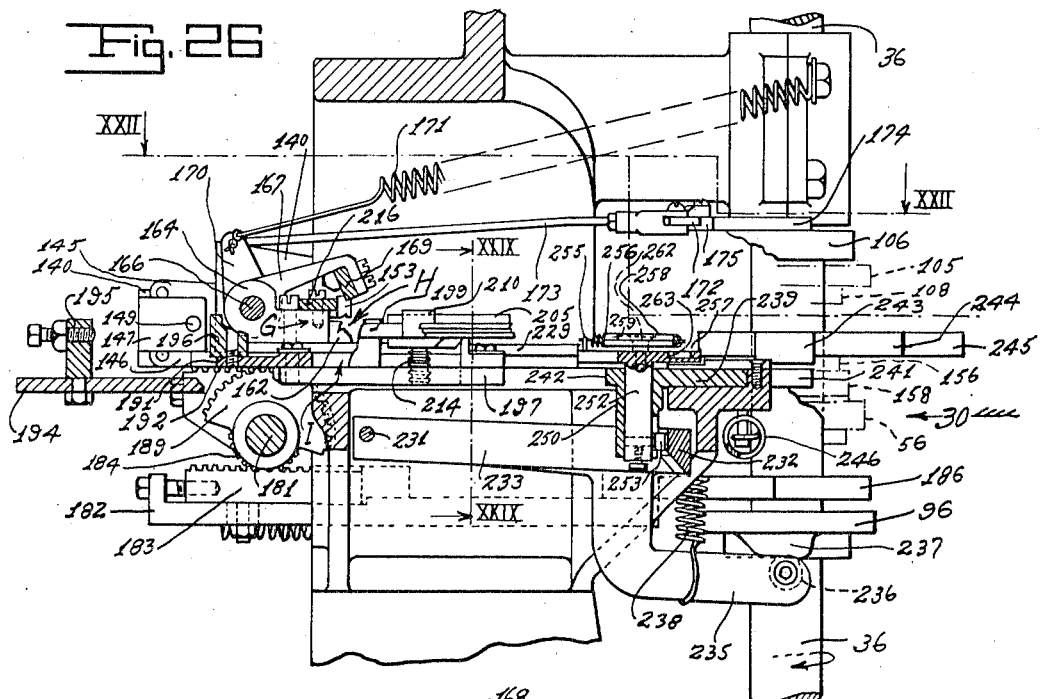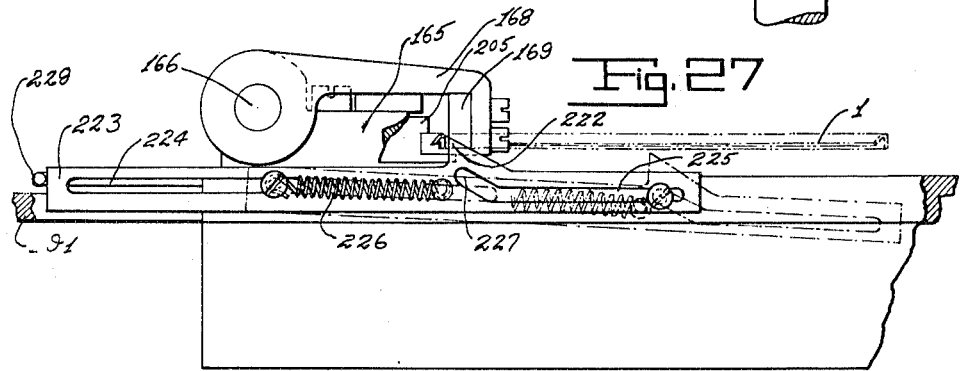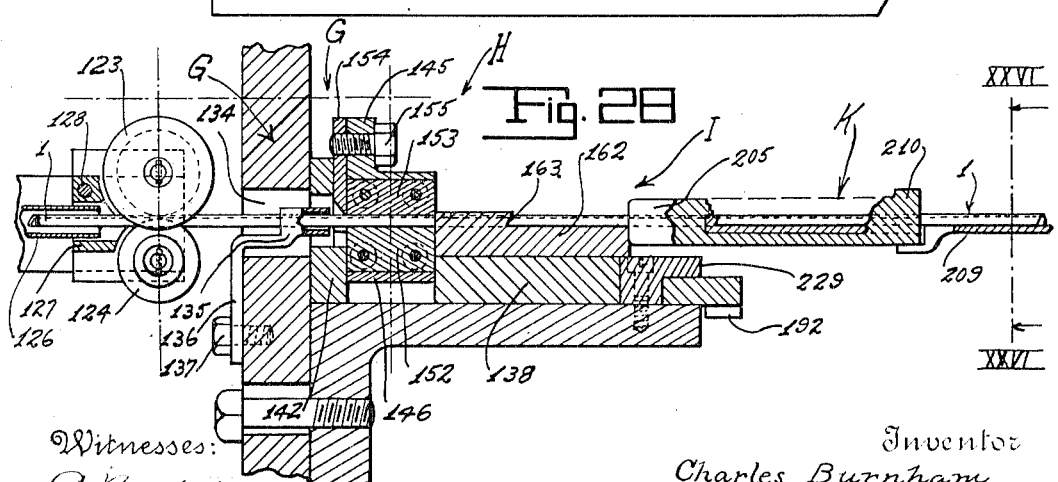

C. BURNHAM.
BOX MAKING MACHINE.
APPLICATION FILED NOV. 29, 1912.
1,119,341.
Patented Dec. 1, 1914.
15 SHEETS—SHEET 12.
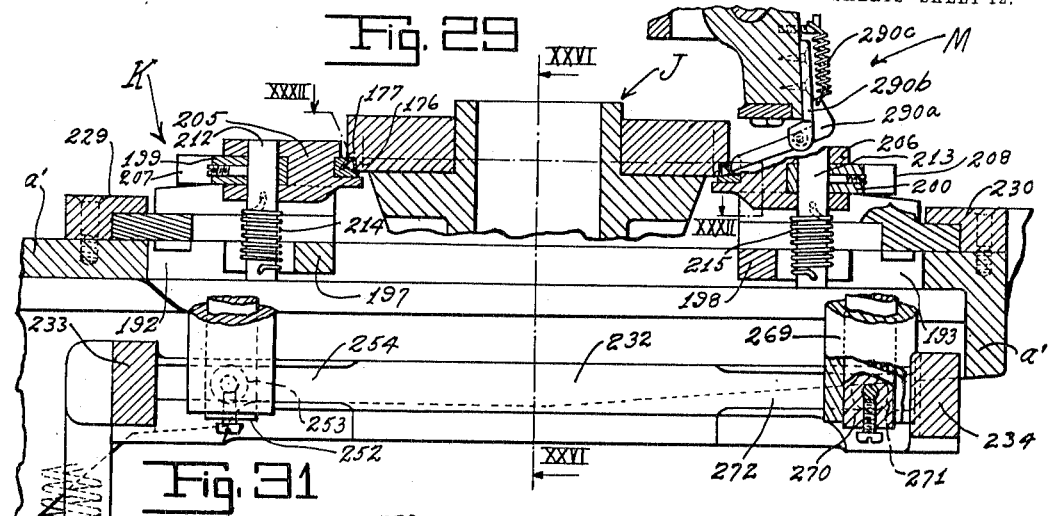
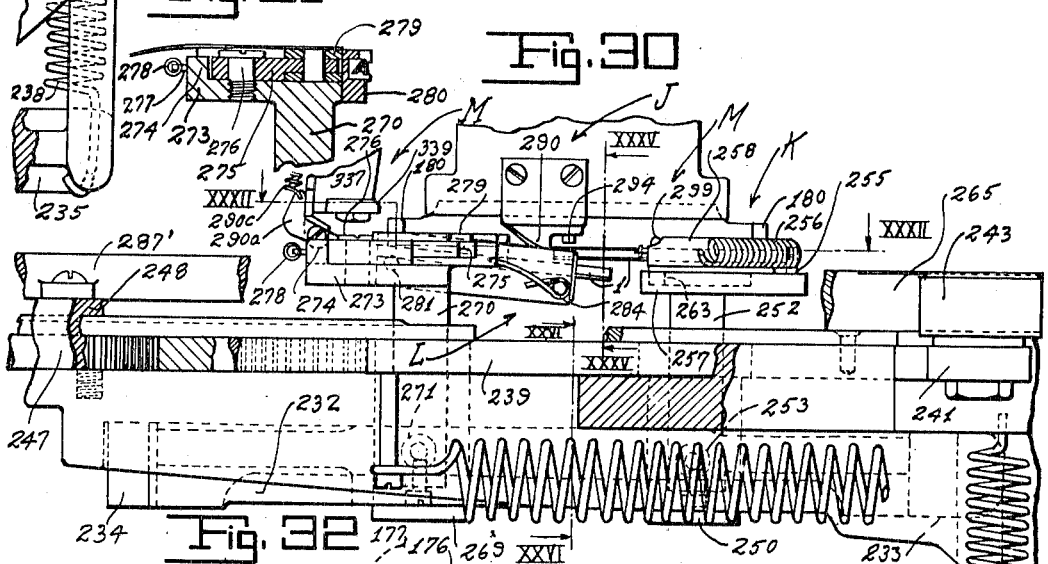
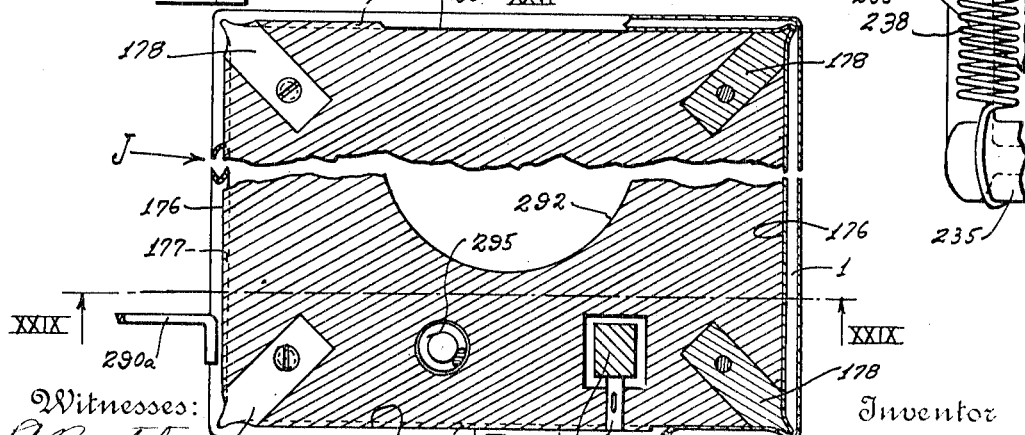
Witnesses:
C. Bartels
L. L. Mayer
Inventor
Charles Burnham
By his Attorneys

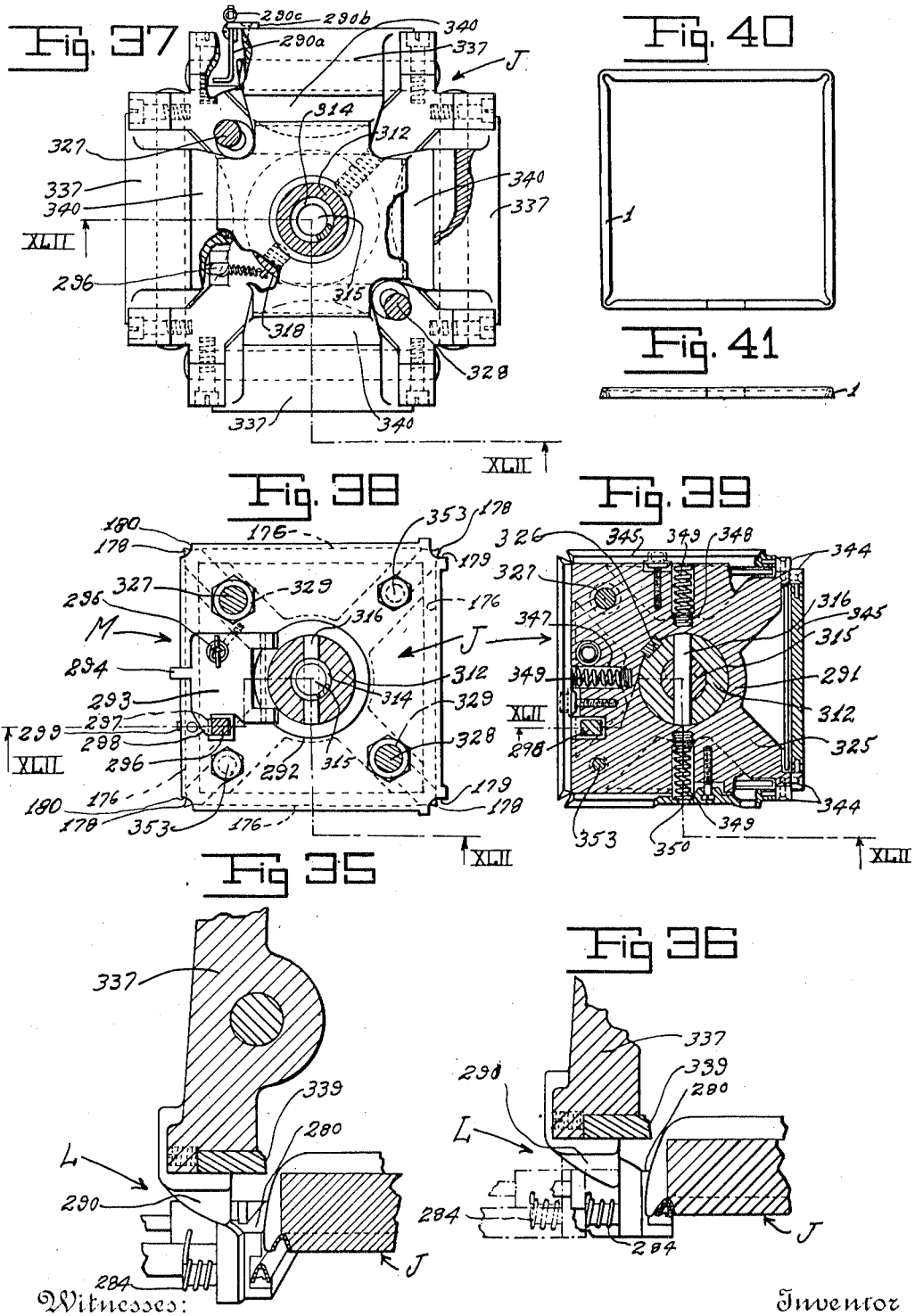

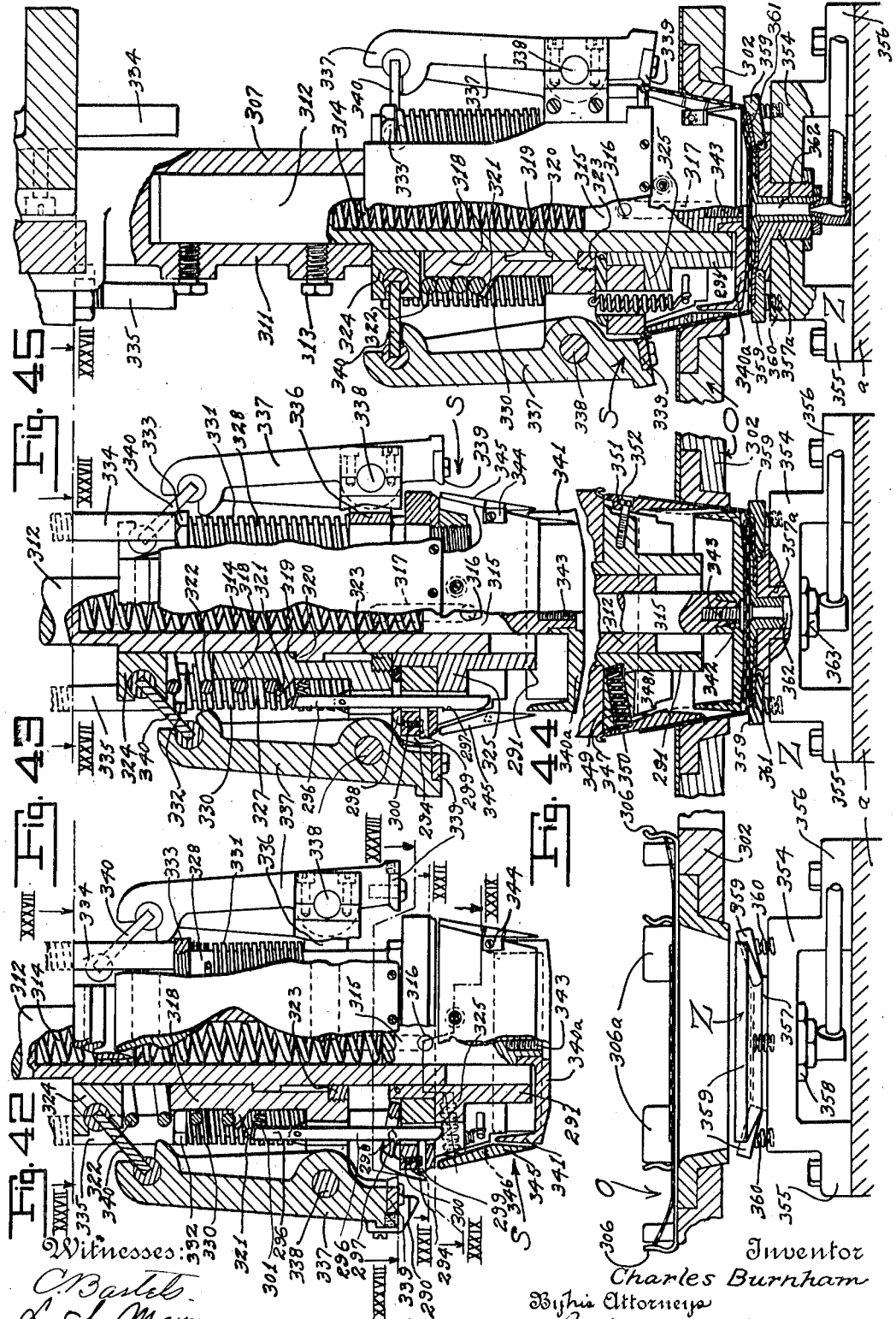

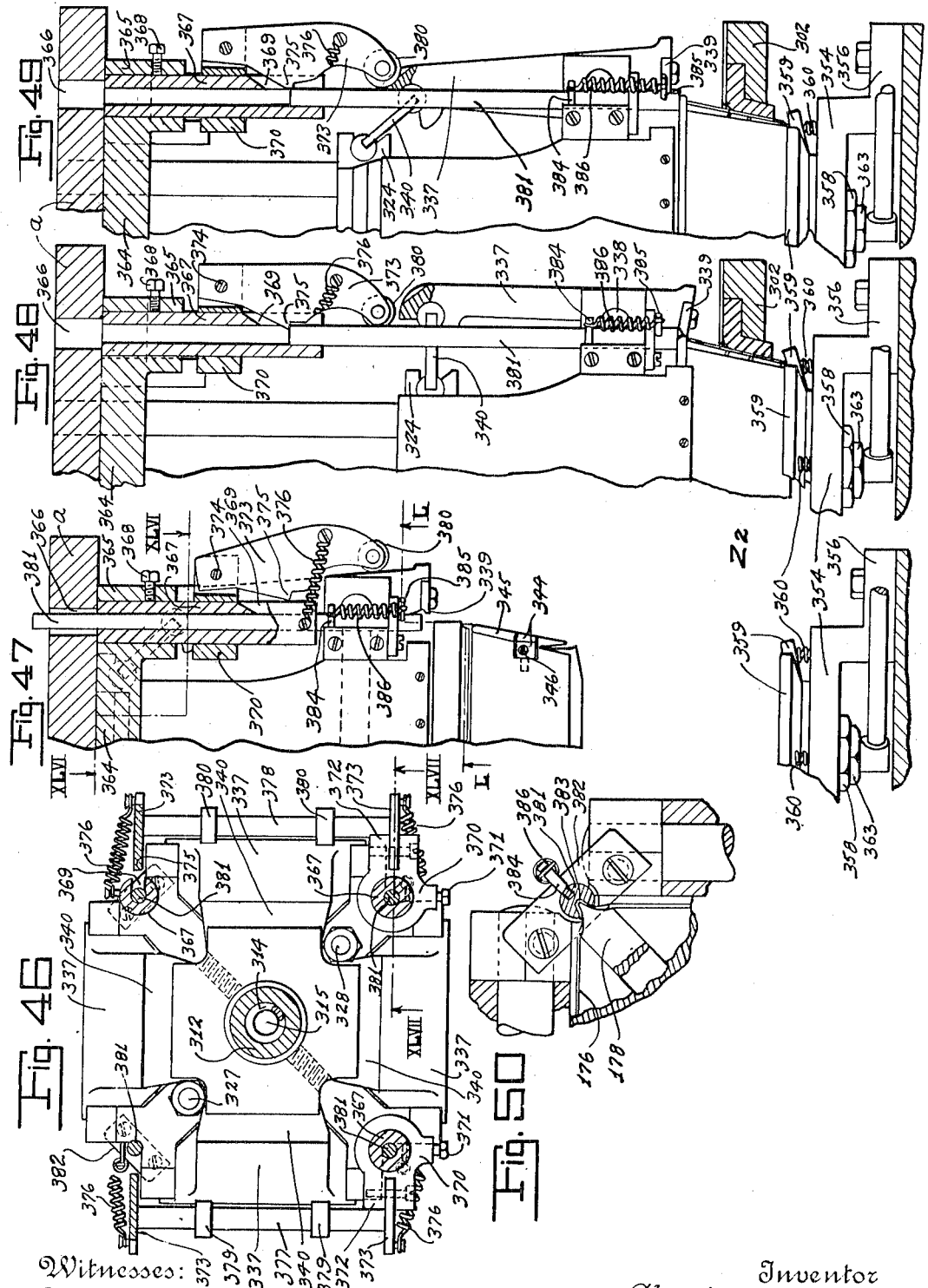

UNITED STATES PATENT OFFICE.

CHARLES BURNHAM, OF LOS ANGELES, CALIFORNIA, ASSIGNOR, BY MESNE ASSIGN-MENTS, TO BURNHAM BASKET COMPANY, A CORPORATION OF CALIFORNIA.

BOX-MAKING MACHINE.

1,119,341.     Specification of Letters Patent.     Patented Dec. 1, 1914.

Original application filed December 26, 1908, Serial No. 469,250. Divided and this application filed November 29, 1912. Serial No. 734,153.

*To all whom it may concern:*

Be it known that I, CHARLES BURNHAM, a citizen of the United States, and a resident of Los Angeles, county of Los Angeles, and State of California, have invented certain new and useful Improvements in Box-Making Machines, of which the following is a full, clear, and exact description.

This invention relates more particularly to the mechanism for feeding and forming the metal binding for boxes or like containers for berries or other fruit made from veneer or any other thin body material, and is a division of my pending application Serial No. 469,250, filed Dec. 26, 1908.

The primary object of the invention is to provide simple and efficient means whereby a metallic strip may be folded lengthwise and then bent transversely into substantially rectangular form corresponding to the shape of the open edge of the box body to which the binding is to be applied, and to clench or apply the said binding to the body in order to hold the parts of the body together.

Another object of the invention is to provide simple and efficient means whereby a metallic binding may be automatically fed from a roll or as a long strip and the said strip cut and formed and bent lengthwise and transversely, and the said strip reformed to adapt the ends to overlap and lie substantially flush, and such binding and a box body automatically brought together and the binding clenched to the box body or to any other object to which the binding may be applied.

Other objects of the invention are to provide simple means whereby a metallic strip may be automatically fed from a roll; to provide simple means for accurately feeding the strip of binding metal; to provide simple means for bending the metal strip lengthwise and for tilting the binding metal; and to provide simple means for cutting the folded binding metal and for bending the same transversely.

A further object of the invention is to provide simple and efficient means for supporting the binding on an anvil and for automatically releasing the binding metal holding means.

A still further object of the invention is to provide simple and efficient means whereby the binding metal may be stripped from the anvil or other means which forms the binding metal into a rectangular form.

With these and other objects in view, the invention will be hereinafter more particularly described with reference to the accompanying drawings, which form a part of this specification, and will then be pointed out in the claims at the end of the description.

In the drawings, Figure 1 is a front perspective taken from the operator's side of the machine and looking in the direction indicated by arrows 1, Figs. 3 and 5. Fig. 2 is a rear perspective looking in the direction indicated by arrows 2, Figs. 3 and 5. Fig. 3 is a perspective of the binding metal end of the machine indicated by arrows 3, Figs. 1, 2 and 5, the roll of binding metal and the binding metal finishing-mechanism being omitted. Fig. 4 is an enlarged detail, partly in section, of the mechanism for coating the binding metal. Fig. 5 is a top plan in perspective, indicated by arrows 5, Figs. 1, 2 and 3. Fig. 6 is an enlarged rear elevation of the binding metal finishing mechanism and the reel of binding metal indicated by arrows 6, Figs. 1, 2, 5 and 7, some of the parts being broken away. Fig. 7 is a side elevation of the parts shown in Fig. 6, indicated by arrows 7, Figs. 5 and 6. Fig. 8 is an enlarged fragmentary top plan of the mechanism for feeding, centering, folding, and tilting the binding metal, indicated by arrows 8, Figs. 1, 2, 3 and 9. Fig. 8ᵃ is a fragmentary perspective detail of the adjustable cam forming a part of the mechanism shown in Fig. 8. Fig. 9 is an enlarged front elevation of the parts shown in Fig. 8, indicated by arrow 9, Figs. 3, 5 and 8. Fig. 10 is an enlarged fragmentary rear elevation of the mechanism for centering, folding, and tilting the binding metal, indicated by arrows 10, Figs. 5 and 11. Fig. 11 is a by arrows 10, Figs. 5 and 11. Fig. 11 is a vertical cross-section of the parts shown in Fig. 10 and taken on the line XI—XI of Figs. 2, 5, 8, 9 and 10. Fig. 12 is an enlarged vertical cross-section of the mechanism for centering and folding the binding metal taken on the line XII—XII of Figs. 2, 5, 8, 9 and 10, and showing the centering mechanism and the folding mechanism open. Fig. 13 is a view similar to Fig. 12 and showing the centering mechanism closed and the folding mechanism open with the binding metal in a central position ready to be folded. Fig. 14 is a view similar to Figs. 12 and 13 and showing the folding mechanism closed. Fig. 15 is an enlarged cross-section of the mechanism for tilting the folded binding metal, taken on the line XV—XV of Fig. 8. Fig. 16 is a horizontal section through the binding metal folding and centering mechanism. Fig. 17 is a horizontal section taken on the line XVII—XVII of Fig. 18. Fig. 18 is a vertical section taken on the line XVIII—XVIII of Fig. 17. Fig. 19 is a cross-section taken on the line XIX—XIX of Figs. 17 and 18. Fig. 20 is a rear fragmentary detail of the mechanism for feeding the binding metal intermittently, and indicated by arrows 20, Figs. 3, 8 and 21. Fig. 21 is a cross-section taken on the line XXI—XXI of Fig. 20. Fig. 22 is a horizontal section taken on the line XXII—XXII of Fig. 26, showing in plan the mechanism for bending the binding metal around the anvil and the coöperating parts. Fig. 23 is a horizontal section showing the bending mechanism in a different position from that shown in Fig. 22. Fig. 24 is a view similar to Figs. 22 and 23 and showing the parts in a different position. Fig. 25 is a view similar to Figs. 22, 23 and 24, and showing the parts in another position while forming the binding. Fig. 26 is a vertical cross-section taken on the line XXVI—XXVI of Figs. 1, 2, 5, 22, 23, 29 and 30. Fig. 27 is a side elevation of a part of the mechanism shown in Fig. 26, and indicated by line XXVII—XXVII of Figs. 2, 5, 22, 23 and 24. Fig. 28 is a fragmentary vertical longitudinal section taken on the line XXVIII—XXVIII of Figs. 17, 18, 23 and 24, showing the passage of the binding metal from the folder through the tilter, cutter, and reformer to the benders. Fig. 29 is a vertical cross-section taken on line XXIX—XXIX of Figs. 24, 25, 26 and 32. Fig. 30 is a side elevation of the parts seen as indicated by the arrow in Figs. 5, 22, 23, 25 and 26. Fig. 31 is a vertical sectional detail on line XXXI—XXXI of Fig. 25. Fig. 32 is a horizontal sectional detail on lines XXXII—XXXII of Figs. 29, 30 and 42, said figure being a plan of the folded binding held in place upon the anvil ready to be applied to the basket body. Fig. 33 is an enlarged perspective of one of the vertically reciprocating posts for operating one of the bender jaws. Fig. 34 is a vertical sectional detail on line XXXIV—XXXIV of Figs. 25 and 33. Fig. 35 is a sectional detail upon an enlarged scale on line XXXV—XXXV of Figs. 25 and 30, with a part of one of the clenchers added to illustrate the operation of overlapping the ends of the folded binding and showing the operation nearly completed. Fig. 36 is a view similar to Fig. 35 and showing the operation of overlapping the ends of the folded binding completed in full lines, and showing the beginning of the operation in dotted lines. Fig. 37 is a horizontal section on lines XXXVII—XXXVII of Figs. 42, 43 and 45. Fig. 38 is a horizontal section upon line XXXVIII—XXXVIII of Fig. 42. Fig. 39 is a horizontal section taken on line XXXIX—XXXIX of Fig. 42. Fig. 40 is a detail plan and Fig. 41 a side elevation of the completed binding metal. Fig. 42 is an enlarged sectional elevation illustrating the punch and dies and showing the punch elevated to receive the binding upon the anvil and to receive the die carrying the body material, and taken on lines XLII—XLII of Figs. 1, 2 and 5. Fig. 43 is a view similar to Fig. 42, the die mechanism being omitted and showing the parts slightly advanced. Fig. 44 is a view analogous to Fig. 42, the upper part of the mechanism being broken away and showing the punch down in the die with the box formed and the binding in position to be applied to the edge of the box. Fig. 45 is a view similar to Fig. 42, showing the completion of the operation of forming the box and applying the binding thereto. Fig. 46 is a sectional plan of the mechanism for stripping the box from the punch and taken on lines XLVI—XLVI of Figs. 1, 2 and 47. Fig. 47 is a sectional elevation on line XLVII—XLVII of Fig. 46. Fig. 48 is a view similar to Fig. 47 and showing the parts in another position. Fig. 49 is a view similar to Figs. 47 and 48, and showing the completion of the operation; and Fig. 50 is a fragmentary horizontal section taken on line L—L of Fig. 47.

While I show the features of the invention as applied to a particular form of machine, it will be understood that many of the features may be used in connection with other forms of machines and that some of the parts may be dispensed with or other features substituted therefor without departing from the spirit of the invention.

In the general operation of the machine and in making berry and fruit boxes for which this invention is particularly adapted, a metallic strip is fed from a reel or otherwise suitably supported convenient to the machine, and this strip by suitable mechanism is fed to what I term forming mechanism, that is the metal is folded or formed lengthwise thereof so as to be substantially V-shaped in order to fit over the edge of the box form. This strip is fed inward and tilted and after being tilted so that it will assume a proper position relative to the edges of the box and the anvil or former about which it is bent according to the shape of the box, the strip is then cut off the proper length. The strip is then fed forward on one side of a substantially rectangular anvil having a shape corresponding to the shape of the open end of the box and until the said strip meets the anvil, when the jaws into which the strip has been previously fed by engagement with the former or anvil will bend both ends of the strip on opposite sides thereof making the same substantially U-shaped. A second pair of jaws engages the free ends of the binding strip and forces the same on the remaining side of the anvil and causes one end of the strip to overlap the other. The shooks of which the box body is made are placed in two magazines located adjacent to one end of the machine, and these shooks are automatically fed upward in position to be removed therefrom. A reciprocatory and rotary pneumatic device is provided for this purpose and this device is automatically controlled so that the shooks will be picked up first from the magazines and the shooks caused to lie crosswise and at substantially right angles to each other. The shooks are folded into box form by suitable die and punch mechanism and the upper edge of the box form is forced into the previously formed binding metal. The binding metal is then pinched on to the shooks thus holding the shooks permanently together in box form. Mechanism is provided for stripping the box and causing the completed box to be carried out of the way and automatically ejected from the machine.

The stock of binding metal 1 is wound upon a spool or reel 2, and the spool is mounted upon a spindle 3 projecting horizontally from near the center of the post or standard 4, said post being mounted upon the base 5 of the machine. This binding metal is a flat strip of the proper width to make the binding of the box and of a length sufficient to bind a number of boxes or baskets.

The mechanism A for advancing the binding metal comprises a bearing block 6 mounted upon the base 5; a shaft 7 in the bearing block; a large driving pulley 8 upon the shaft 7; a belt 9 connecting the driving shaft 10 to the pulley 8; a frame 11 pivotally mounted upon the shaft 7; a pulley 12 carried by the free end of the frame 11; a belt 13 extending around the pulley 12 and around the pulley 14 upon the shaft 7; the guide roller 15 carried by the upper part of the main frame; the cable 16 connected to the frame 11 and extending upwardly over the guide roller 15; and the weight 17 attached to the cable; so that the belt 13 will engage the binding metal 1 upon the spool 2 and the weight 17 will pull the frame 11 upwardly to hold the belt 13 against the binding metal and rotate the spool to unwind the binding metal just fast enough to furnish the required amount of binding metal for the boxes.

The mechanism B for finishing the binding metal comprises a buffing wheel 18 and suitable means for operating the buffing wheel mounted upon the post 4; a bracket 19 extending from the post 4 under the buffing wheel 18, bifurcated arms 20 and 21 mounted upon the pivot 22 carried by the bracket 19, said bracket being bifurcated to receive the arms; the guide rollers 23 and 24 mounted between the bifurcations of the arms 20 and 21 upon spindles; and the retractile coil spring 25 connecting an ear upon the arm 20 with an ear upon the arm 21; so that the binding metal 1 will pass upwardly over the guide rollers 23 and 24 and be pressed yieldingly against the buffing wheel 18 so as to buff and finish the upper surface of the binding metal as it passes to the machine to be used.

The bifurcations of the arms 20 and 21 are connected closely across the tops of the guide rollers 23 and 24 so as to guide and hold the binding metal in place upon the guide rollers. The buffing wheel 18 may be run in the direction indicated by the arrow in Fig. 7, so that the friction of the buffing wheel upon the binding metal will tend to draw the binding metal from the spool as fast as the spool is operated by the mechanism A to unwind the binding metal.

The base 5 supports the entire machine, and the superstructure of the frame $a$ is supported upon posts $25^a$, 26, 27, 28 and 29 securely mounted upon the base 5. The driving shaft 10 is mounted horizontally longitudinally of the base, and in bearings supported by the posts $25^a$, 26 and 27. The drive wheel 30 is loosely mounted upon the shaft 10 near the center of the machine and may be connected to the engine, motor or other source of power by a belt. A fly wheel 31 is fixed upon the shaft 10 near the drive wheel, and a clutch mechanism 32 is mounted upon the shaft and is controlled by the operating lever 33 which connects the drive wheel 30 to and disconnects the same from the shaft 10. The operating lever is connected at its lower end to the base by the pivot 34, and the central portion of the operating lever is bifurcated to receive the clutch mechanism 32 and is connected to the clutch mechanism by the pivot pins 35, so that when the upper end of the lever which serves as a handle for the operator is moved one way the machine is started, and when the lever is moved the other way the machine is stopped. The front side of the machine as shown in Fig. 1, is the operator's side of the machine, and the handle 33 of the operating lever is in convenient position for use from that position. The driving shaft 10 runs at a comparatively high rate of speed, and the shaft 7 is set at right angles to the driving shaft. The binding metal is fed at a comparatively slow speed, and the belt 9 is crossed to run from the shaft 10 to the pulley 8. This pulley 8 is large and the belt 9 is made to run directly upon the shaft so as to drive the shaft 7 at much slower speed, and the pulley 14 is small so as to drive the belt 13 at a lower rate of speed. It is obvious that all of these proportions must be studied and timed so as to feed the binding metal at a speed equal to the demands of the machine.

A large number of the motions of the machine are derived directly from the cam shaft 36, said cam shaft being mounted vertically near the center of the machine. A helical toothed gear 37 is fixed upon the lower end of the cam shaft and meshes with the worm 38, Fig. 2, upon the driving shaft 10.

The mechanism B' for wiping the finished binding metal is shown in detail in Fig. 4. A box is mounted upon the side of the frame $a$ and comprises the bottom $b$ for the binding metal 1 to rest upon as it passes to the machine, a flaring mouth $c$ leading to the bottom $b$, said box containing waste or other suitable wiping material $d$, and there being a removable side plate $e$ held in place by wing nuts to provide access to the wiping material. An adjustable pressure plate $f$ is regulated by the feed screw $g$ so that the tension of the wiping material upon the binding metal may be regulated, and so that the wiping material may be removed and renewed; the object of this wiping material being to remove all the dirt from the binding metal before it passes into the lacquer as will be presently described.

The mechanism $B^2$ for coating the binding metal is shown in enlarged detail in Fig. 4. Lacquer or other coating may be used. The lacquer can $h$ is mounted upon the frame $a$ directly in front of the mechanism B, and the can is provided with an air-tight filling nipple $i$ and a suitable air-tight drain-valve. The lacquer pan $k$ is mounted below the can $h$ upon the side of the frame $a$, said pan being normally open at the top, and the pipe $k'$ leads from the drain valve (not shown) into the pan $k$, the receiving end of the pipe being open; and a feed-adjusting tube is adjustably mounted upon the nipple of the drain valve so as to provide a student lamp feed from the lacquer can $h$ to the lacquer pan $k$, thereby maintaining the desired level of lacquer $o$ in the pan $k$. As the lacquer is used and the level lowered, air will be admitted to the can $h$ through the drain valve, thereby releasing more lacquer. A guide roller $p$ is mounted in position to depress the binding metal 1 into the lacquer $o$ in the pan $k$ so that as the binding metal is advanced into the machine it is submerged in lacquer.

The mechanism $B^3$ for wiping the coated binding metal is shown in enlarged detail in Fig. 4. The wiper base $q$ is secured to the side of the frame $a$ by a cap screw and a channel (not shown) is cut in the face of the base in the line of travel of the binding metal 1. Leather wiping pads $s$ and $t$ are mounted in the bottom of the channel with the binding metal passing between the pads after it leaves the lacquer $o$. A clamping plate $u$ is secured to the side of the base $q$ by the cap screw $v$ provided with an operating handle $w$, and a finger $x$ extends from the clamping plate $u$ behind the wiping pads $s$ and $t$ against the edge of the binding metal to hold the binding metal in line. A presser plate $y$ is mounted upon the wiping pad $s$ and is held adjustably in position by the adjusting screw $z$, so that the pressure of the wiping pads $s$ and $t$ upon the binding metal may be regulated by manipulating the screw $z$. The wiping pads are located close to the edge of the lacquer pan $k$ so that the lacquer wiped from the binding metal will drain into the pan.

The mechanism C for feeding the binding metal intermittently comprises the eccentric sleeves 39 and 40, Fig. 20, mounted transversely and in parallel position; the interlocking teeth 41 and 42 for connecting the sleeves together; the compression shafts 43 and 44 rotatably mounted in the eccentric sleeves; the gears 45 and 46 connecting the shafts together; the compression feed rollers 47 and 48 upon the opposite ends of the shaft; means for driving the compression shafts, and means for operating the eccentric sleeves. A bevel gear 49 is fixed upon one of the compression shafts and meshes with the bevel gear 50 upon the countershaft 51, and a sprocket chain 52 connects a sprocket wheel upon the countershaft 51 with a sprocket wheel upon the driving shaft 10, so as to rotate the compression feed rollers 47 and 48 continuously when the driving shaft is running. The teeth of the gears 45 and 46 are long enough to retain them constantly in mesh even when the shafts 43 and 44 are operated to separate the compression feed rolls. A pair of teeth 53 project downwardly from the eccentric sleeve 40, a lever 54 being mounted upon a pivot 55 transversely of the machine with one of its ends loosely held between the teeth 53. An adjustable cam 56 is fixed upon the cam shaft 36, said cam having an outer concentric peripheral surface 57 and an inner concentric peripheral surface 58. The connecting rod 59 is forked at one end to slide upon the cam shaft 36 under the cam 56, and a roller 60 mounted upon the connecting rod engages the cam surfaces 57 and 58 so as to reciprocate the connecting rod by the rotation of the cam shaft. The connecting rod 59 is bored at the opposite end from the cam shaft 36 to receive the sliding extension 61, and this sliding extension is connected to the lever 54 by a bolt 62. An adjusting rod 63 is connected to the connecting rod 59 and slides through the bolt 62, there being an adjusting nut 64 upon the rod 63 provided with a handle, and a jam nut 65 to hold the adjusting nut in its adjusted position. An expansive spring 66 is mounted upon the extension 61 against the end of the connecting rod 59 to hold the connecting rod mechanism in its extended position. As the cam shaft 36 rotates the connecting rod mechanism 59 operates the lever 54 to operate the eccentric sleeves 39 and 40 to move the compression feed rollers 47 and 48 to and from each other, and the binding metal 1 passes between the compression feed rollers and is drawn from the finishing and unwinding mechanism and fed to the folding mechanism, and the amount of metal fed at each cycle of the machine is determined by the relative lengths of the peripheral faces 57 and 58. The cam 56 is adjustable as shown in Fig. 8ᵃ to change the relative lengths of the peripheral faces 57 and 58. The extension block 57ᵃ has a tongue-and-groove connection with the end of the peripheral face 57, and the screw 57ᵇ inserted through an elongated slot in the block and screw-seated in the body of the cam forms a sliding connection for the block, so that the block forms an adjustable extension of the peripheral face 57, and by manipulating this extension the length of feed of the binding metal 1 may be regulated. A retractile coil spring 67 connects the connecting rod 59 to the frame so as to hold the compression feed rollers normally separated or inactive, and so as to press the roller 60 against the cam 56, and when the roller 60 is against the surface 58 of the cam the compression feed rollers 47 and 48 are open and inactive; and when the cam 56 turns and the roller 60 rides upon the surface 57 the compression feed rollers 47 and 48 are moved toward each other to grip the binding metal, a pressure adjusting wedge 68, Fig. 20, being secured to the frame by a bolt 69 in position to regulate the swing of the teeth 53 so as to regulate the pressure of the compression rollers upon the binding metal. The wedge is adjusted by loosening the bolt and rotating the wedge slightly one way or the other and then tightening the bolt. When the connecting rod mechanism operates to bring the rollers to exert the desired pressure upon the binding metal, the teeth 53 will press against the wedge 68 and the continued operation of the cam 56 will press the spring 66 and slide the extension 61 into the end of the connecting rod 59 and slide the rod 63 through the pin 62. The connection between the connecting rod 59 and the lever 54 may be minutely adjusted by manipulating the adjusting nut 64 and the jam nut 65. It will be evident that as the binding metal is fed continuously from the reel and as the mechanism C feeds it intermittently, there is considerable slack in the strip when the intermittent means is stationary as shown in Fig. 2.

Suitable means as the mechanism D may be provided for centering the fed binding metal and comprises the centering bars 70 and 71 mounted in position so that the binding metal 1 passes from the feed rollers 47 and 48 between the bars 70 and 71. The bars are open as shown in Fig. 12 when the binding metal is moving and said bars are closed as shown in Fig. 13 during the operation of folding the fed binding metal lengthwise. This mechanism for centering the fed binding metal includes the connections from the driving shaft 10 to the bars 70 and 71 for opening and closing said bars.

To fold the centered binding metal lengthwise, I provide the mechanism E. This mechanism comprises a rigid inverted V-shaped folder member 72 and a reciprocating folder member 73, and the mechanism for operating the reciprocating folder member from the driving shaft. The folder member 72 is formed upon or attached to the face of the folder plate or bar 74, said folder plate being removably and rigidly secured to the frame by bolts 75. The reciprocating folder member 73 is a thin strip of hardened steel mounted in a folder or bar 76 in opposition to the rigid member, and in turn this folder 76 is mounted in a reciprocating head 77. A recess or seat 78 is formed in the frame to receive the reciprocating head 77 so that the head may reciprocate from the open position of the folder as shown in Fig. 12 to the closed position of the folder as shown in Fig. 14.

Three pairs of shafts 79 and 80 are mounted vertically in transverse alinement through the reciprocating head 77, and segmental gears 81 and 81′ fixed upon the lower ends of the shafts 79 and 80 intermesh to connect the shafts together. Cranks 82 are fixed upon the upper ends of the shafts, and the centering bars 70 and 71 are mounted upon the pins of the cranks. The heads 83 are pivotally mounted upon the set screws 84, said set screws being seated in the gears 81′ and set against the shaft 80 to hold the gears in place. Levers 85 are pivotally mounted upon lag screws 86 seated in the frame, the upper ends of the levers being bifurcated to slidingly mount the heads 83. A connecting rod 87 is mounted through the lower ends of the levers 85, there being a set collar 88 upon one side of each of the levers, and a sliding collar 89, an expansive spring 90 and a set collar 91 upon the other side of each of the levers as shown in Fig. 10. A lever 92 is pivotally mounted transversely of the machine, one end of the lever being slotted to receive the connecting rod 87, and there being a set collar 93 upon the connecting rod to hold the lever 92 against one of the set collars 88. A retractile coil spring 94 connects an arm projecting from the lever 92 to an adjusting bolt 95 slidingly mounted through a stud projecting from the frame, the tension of the spring 94 being exerted in opposition to the tension of the spring 90 as shown in Fig. 10. A cam 96 is mounted upon the cam shaft 36; a cam fork 97 is mounted to slide endwise upon the shaft 36 on top of the cam 96; a connecting rod 98 connects the cam fork to the lever 92; and a roller 99 carried by the cam fork engages the periphery of the cam 96, said cam 96 being shaped to cause a vibration of the lever 92, thereby reciprocating the center bars 70 and 71 to center the fed binding metal. The tension of the spring 94 is exerted in opposition to the cam 96 so as to press the roller 99 against the periphery of the cam and to open the centering bars.

The folder shafts 100 and 101 are mounted transversely through the frame under the reciprocating head 77, and the ends of the shafts are eccentrically recessed to receive the links 102, said links also being recessed in the reciprocating head 77 so that when the shafts 100 and 101 are rocked, the reciprocating head 77 is moved up and down to fold the binding metal lengthwise. A connecting rod 103 is connected to the upper ends of the crank arms 104 and 104' fixed upon the ends of the shafts 100 and 101, and a cam fork 105 integral with the connecting rod slides upon the cam shaft 36. An operating arm 106 is fixed upon the cam shaft and the periphery of the cam engages the roller 107 carried by the cam fork 105. A return cam 108 is fixed upon the cam shaft below the fork 105, the periphery of the return cam engaging the roller 109 carried by the cam fork, so that when the cam shaft 36 is rotated the connecting rod 103 is reciprocated to reciprocate the crank arms 104 and 104' and rock the shafts 100 and 101 to reciprocate the head 77. The crank arm 104 is slotted at 104ᵃ to engage a pin carried by the connecting rod 103 to be operated by the movement of said rod. A retractile coil spring 110 connects the arm 111 to the frame, the tension of the spring being exerted to hold the roller 107 against the periphery of the cam 106 and to open the folder. The arm 111 is an extension of the pivot pin which connects the connecting rod 103 to the arm 104'.

A rock shaft 112 is mounted in bearings 113 on top of the frame carrying the folder. Arms 114 are fixed upon the shaft by set screws, there being a spring 115, Fig. 14, between the end of one of the arms 114 and the frame to hold the arms in their elevated position. Stripper rods 116 are mounted vertically in the rigid folder member 74 and connected to the arms 114 so that when the shaft 112 is rocked the strippers will kick the folded binding metal out of the inverted V of the folder. A stop arm 117, Fig. 8, is adjustably fixed upon the rock shaft to limit the movement of the shaft under expansion of the springs 115. An operating arm 118, Figs. 9 and 11, is adjustably fixed upon the shaft 112 with a roller 119 at its free end. A pawl 120 is pivotally mounted against the end of the arm 111, there being a stop 121 projecting from the arm 111 to limit the movement of the pawl in one direction, and the head of the pawl is rounded so that it may move by the stop in the other direction. The roller 119 is in the path of the pawl 120, said pawl vibrating by the action of the cam shaft 36 through the connecting rod 103, and when the pawl 120 moves forwardly the roller 119 engages the pawl and is elevated to rock the shaft 112 and kick the folded binding metal from the inverted V of the folder and the continued action of the machine passes the pawl 120 beyond the roller 119, and upon the return of the pawl the point of the pawl strikes against the roller and the pawl turns upon its pivot under the tension of the spring 122, Fig. 11, and is inoperative.

The mechanism F for tilting the folded binding metal is shown in detail in Figs. 8, 10 and 15. After the binding metal has been centered and folded it is in the form of an inverted V, the two sides of the V being equally inclined relative to a vertical line, and it is desired to tilt this folded binding metal so that what becomes the inner side of the binding will be vertical in order to facilitate the bending of the binding metal transversely around the anvil so as to be rectangular in form. A grooved tilting roller 123, and a mating tongued roller 124 are mounted to run freely upon trunnions rigidly fixed in the frame in position so that the folded binding metal passing from the lengthwise folder will pass between the rollers. The rollers are so constructed that the inner face 125 of the tongue of the roller 124 is vertical and the corresponding face of the grooved roller 123 is vertical so that as the folded binding metal passes between the rollers it is tilted to bring what becomes the inner side of the binding to a vertical position before the binding is brought into contact with the anvil. These tilting rollers 123 and 124 are mounted upon rigid trunnions. A guide tube 126 is adjustably mounted by means of a set screw in the pivoted bearing 127 secured to the frame by the screw 128. A crank arm 129 is secured to the frame by a pivot pin 130, and a block 131 is connected to the swinging end of the crank arm by the crank pin 132. The guide tube 126 is slidingly mounted in the block 131. The guide tube serves to guide the binding metal from the folder to the tilting rollers, and the end of the guide tube adjacent to the folder operates in a recess 133 in the frame, said recess being larger up and down than the tube so as to allow the tube to vibrate up and down as the reciprocating head 77 of the folder vibrates.

The mechanism G for cutting and the mechanism H for reforming one end of the tilted binding metal are shown in detail in Figs. 17, 18, 19 and 28. An opening 134 is formed in the frame, and a tubular guide 135 is mounted in this opening to receive the binding metal from the tilting rollers and guide it to the cutter, said tubular guide being held adjustably in position by the arm 136 extending downwardly beside the frame and secured to the frame by a cap screw 137. The housing comprises a base 138 secured to the frame, a standard 139 extending upwardly from the base, a cap 140 extending laterally from the standard, and a second standard 141 extending downwardly from the cap. A sliding block 142 is mounted against the inner face of the standard 141, and a slot 143 is formed horizontally through the sliding block. The reformer pivot 144 is mounted horizontally in the standards 139 and 141. The upper reformer lever 145 is half lapped with the lower reformer lever 146, and said levers are mounted upon the pivot 144 beside the sliding block 142 so as to fill the housing space between the standards 139 and 141. A bearing block 147 is mounted parallel with the end of the sliding block 142 and connected therewith by the arm 148. The toggle pivot 149 is mounted horizontally through the sliding block 142 and the bearing block 147, and the toggle links 150 and 151 connect the pivot 149 to the ends of the reformer levers 145 and 146, so that as the sliding block 142 is reciprocated the levers 145 and 146 are vibrated. The lower reformer die 152 is fastened transversely of the end of the reformer lever 146, and the upper reformer die 153 is fixed transversely of the end of the reformer lever 145. The upper die is grooved and the lower die has a tongue to fit the folded binding metal, the tongue and groove being larger than the tongue and groove of the lengthwise folder; the object being to expand one end of the folded binding metal so that when the binding is applied to the box or basket, the ends will overlap and fit and the ends at the joint lie substantially flush.

An ear extends upwardly from the end of the reformer lever 145, and the cutter blade 154 is placed beside the lever and secured to the ear by the bolt 155, said cutter blade acting in conjunction with the end of the lower reformer die 152 to sever the binding from the stock just before the completion of the operation of reforming the end of the binding. The cam fork 156, Fig. 17, is adjustably connected to the sliding block 142 by bolts 157 operating in slots. A cam 158 is fixed upon the cam shaft 36 and has a tooth 159 to engage the roller 160 projecting downwardly from the cam fork 156, said cam fork sliding upon the cam shaft 36 above the cam 158. A retractile coil spring 161 connects the sliding block 142 to the frame, the tension of the spring being exerted to hold the roller 160 against the periphery of the cam 158, thereby holding the reforming dies 152 and 153 separated, and then the continued operation of the machine brings the tooth 159 into contact with the roller 160 thereby reciprocating the cam fork 156 and the sliding block 142 to straighten the toggle links 150 and 151 and operate the levers 145 and 146 to bring the reforming dies together, thereby cutting the binding from the stock and reforming the end of the binding.

To guide the cut binding metal to the benders, I provide mechanism as at I as shown best in Figs. 22, 23, 26 and 28. A rigid guide plate 162 is secured to the frame and has a groove 163 in its front face to receive the binding from the reformer mechanism H, said groove being shaped to fit the tilted binding, the inner side of the binding being vertical and the outer side of the binding being at an angle of about forty-five degrees relative to a vertical or horizontal line as shown in Figs. 27 and 29. Bearings 164 and 165 are rigidly mounted upon the frame, and a rock shaft 166 is mounted in the bearings. Crank arms 167 and 168 are fixed upon the rock shaft 166 beside the bearings, and the movable guide bar 169 is attached to the outer ends of the crank arms in position to swing down in front of the binding in the groove 163 and hold the binding in the groove as the binding moves to the transverse benders to be presently described. An operating arm 170 is fixed to the rock shaft and extends upwardly, and a retractile coil spring 171 connects the arm to the frame, the tension of the spring being exerted to swing the guide bar 169 down to the position shown in Fig. 27 to guide the binding. A cam lever 172 is pivotally connected at one of its ends to the frame, and an adjustable connecting rod 173 connects the swinging end of the cam lever 172 to the crank arm 170. A segmental cam 174 describing nearly half a circle is secured to the upper face of the cam 106, and a cam roller 175 carried by the cam lever 172 engages the cam 174 as the cam shaft 36 rotates, thereby overcoming the tension of the spring 171 and operating the crank arm 170 and the rock shaft 166 to elevate the guide bar 169 to the position shown in Fig. 26 so as to release the binding from the guides and permit the transverse benders to operate. The guide bar 169 is held elevated during the operation of the benders which requires something less than half a cycle of the machine, and the guide bar is held depressed during the movement of the binding metal through the cutter and reformer which requires the remainder of the cycle of the machine.

As a means for bending the binding metal transversely, a mechanism J in the form of a clenching anvil is shown in detail in connection with the transverse benders in Figs. 22, 23, 24, 25 and 29, 30 and 31, and it is also shown in other figures in connection with the overlapping mechanism, the clenching mechanism, and the punch and die mechanism. The clenching anvil is square in plan and is finished to form the vertical clenching faces 176 on all four sides and just above its lower face, and to form the shoulders 177 above the clenching faces so as to receive the folded binding and hold the folded binding from moving upwardly as shown for instance in Fig. 29. The anvil thus shaped is provided with hardened corners 178 said corners being dovetailed into the casting and held removably in position by screws, and the points of the corners projecting slightly beyond the clenching faces 176 of the anvil. These shoulders 177 are extended on each side of the two forward corners of the anvil, and the corners are cut away in the extensions to form the first bender bearings 179, and at the two other corners of the anvil the shoulders are cut away to form the second bender bearings 180.

The mechanism K for bending the binding metal around the anvil in a rectangular form is shown in four different steps of the operation in Figs. 22, 23, 24 and 25, and it is also shown in other figures. The bender rock shaft 181 is mounted longitudinally of the line of travel of the binding metal and in the frame. A slide 182 is mounted in the frame transversely of the shaft 181, and a rack 183 is adjustably mounted upon the slide in mesh with the pinion 184 fixed upon the bender rock shaft 181. A roller 185 upon the slide engages the periphery of the cam 186 upon the cam shaft 36, said cam being mainly circular in plan, and there being an inclined cam tooth 187 to engage the roller 185 and move the rack 183, thereby rotating the shaft 181. The retractile coil spring 188, Fig. 17, is connected to the frame and to the slide 182 to hold the roller 185 against the cam 186 and to return the rack to its normal position after the tooth 187 has passed the roller. The shaft 181 has segmental gears 189 and 190 fixed thereto, which are adapted to operate the sliding bender frame. This frame comprises a plate 191 parallel with the shaft 181, the gear racks 192 and 193 being arranged transversely of the ends of the plate 191 and meshing with the segmental gears 189 and 190 so that at each cycle of the machine the plate 191 is carried toward and away from the clenching anvil J. An arm 194 extends from the rigid frame under the sliding frame and an adjustable stop 195 extends upwardly to engage the buffer 196 secured to the plate 191 to limit the backward motion of the bender frame. The bearing plates 197 and 198 are adjustably secured at their outer ends to the lower face of the plate 191 and at their inner ends to the inner ends of the racks 192 and 193. Pivotally secured to the plates 197 and 198 are the bender links 199 and 200 respectively, and extending outwardly from the links are fingers 201 and 202 which are adapted to engage the adjustable stops 203 and 204 to limit and adjust the movement of the links in one direction. There are four bender jaws for bending the metal binding about the anvil, which are opposed in pairs and likewise act in this manner on the binding metal. The first bender jaws 205 and 206 are bifurcated and pivoted to the inner ends of the links 199 and 200 respectively, there being stops 207 and 208 extending outwardly from the ends of the links to engage the jaws and limit their backward motion. A central bending bar 209 pivotally connects the jaws 205 and 206, the joints at the ends of the bar being in the form of hinges and the upper members of the hinges forming cams 210 and 211 to engage in the bender bearings 179. The pivot pins 212 and 213 which connect the links 199 and 200 to the jaws 205 and 206 extend downwardly, Fig. 29, and torsion springs 214, 215, are mounted upon the pins, one end of each spring being connected to the pin and the other end of the spring being connected to the corresponding jaw, the tension of the springs being exerted to hold the jaws in alinement to receive the binding. A plate 216 is mounted above the sliding plate 191. This plate has rollers 217 and 218 which extend downwardly and are adapted to engage the shoulders 219 and 220 back of the cams 210 and 211 as the bender frame moves outwardly to its normal position, the purpose of the rollers being to straighten the jaws and hold the parts in alinement to receive the binding metal.

Referring to Figs. 23, 24 and 25, the binding metal passes between the tilting rollers from the folder, and between the cutters, then through the reformer, then between the rigid guide block 162 and the movable guide bar 169, then along the faces of the jaw 205, the central bending bar 209, and the jaw 206, the movable guide bar 169 being in front of the said parts 205, 209 and 206, and said parts being grooved to receive the folded binding, as shown in end elevation in Fig.

27. As soon as sufficient binding has been threaded through the bender mechanism as just described, the cutter and reformer mechanism operate to separate the binding from the stock. Yielding binding retainers are provided to hold the binding in the benders while the benders are moving to the anvil. The binder retainers have teeth 221 and 222 to move up in front of the binding and hold the binding in the benders as shown in Fig. 27. The teeth are formed integral with the bars 223 having slots 224 and 225, and screws are inserted through the slots into the frame to slidingly mount the bars. Retractile coil springs 226 connect the bars to the frame to hold the teeth yieldingly against the binding so that as the binding moves toward the anvil the springs will stretch. The ends of the slots 225 adjacent to the teeth are turned upwardly to form the cams 227 so that when the cams 227 engage the corresponding screws the teeth will be moved downwardly out of engagement with the binding metal so as to allow the binding metal to be bent around the anvil. The mechanism is timed to have the teeth 221 and 222 release the binding metal just as the binding metal is brought against the clenching anvil. Adjustable stops 228 extend outwardly from the frame to be engaged by the ends of the bars 223 to limit the outward movement of the bars under the tension of the springs 226 so as to stop the teeth 221 and 222 exactly in the right place to come in front of the binding as shown in Figs. 23 and 27.

After the binding has been severed from the stock, the cam tooth 187 contacts with the roller 185, moving the rack 183 outwardly and operating the segments 189 and 190 and moving the bender frame toward the anvil J. When the central bending bar 209 comes in contact with the anvil shown in Fig. 24, the cams 210 and 211 are in the bender bearings 179. Just at this time the retaining teeth 221 and 222 pass out of engagement with the binding, and the continued operation of the machine moving the bender frame causes the jaws 205 and 206 to swing toward the sides of the anvil, as shown in Fig. 22, thereby bending the binding around these two of the hardened corners 178 and bringing the binding against the sides of the anvil as shown in Fig. 25. The plate 191 and the racks 192 and 193 may be formed integral as shown, or arms may extend backwardly from the ends of the plate 191, and the racks may be formed separately and attached to the arms; the only essential being that the plate 191 shall join and hold the racks together. Flanges extend beyond the racks to engage in the slide ways, said slide ways being formed by attaching the guide plates 229 and 230 to the frame a', the inner lower faces of the guide plates being recessed so that the sliding bender frame may slide between the guide plates and the frame. A pivot shaft 231 is mounted horizontally in the frame parallel with the rock shaft 181, and the pivoted bender frame is mounted upon this shaft. This bender frame comprises the rear longitudinal bar 232 and arms 233 and 234 connecting the ends of the bar 232 to the shaft 231, the operating arm 235 extending downwardly and laterally from the arm 233, and the cam roller 236 mounted upon a trunnion in the outer end of the arm 235 to be engaged by the tooth 237 carried by the cam 96 upon cam shaft 26. A retractile coil spring 238, Fig. 30, connects the arm 235 to the frame. The tension of the coil spring 238 is exerted to hold the pivoted bender frame in its elevated position with the roller 236 against the lower face of the cam 96, and the tooth 237 engaging the roller 236 overcomes the tension of the spring 238 to depress the bar 232.

The rear bender slide comprises a plate 239 mounted to slide horizontally and longitudinally of the machine and crosswise of the line of travel of the forward bender frame, the gear rack 240 connected to the plate 239, the arm 241 extending rearwardly, and the arm 242 extending forwardly. The cam roller 243 is mounted upon a trunnion extending upwardly from the arm 241 and engages the circular periphery of the cam 244 upon the cam shaft 36, and the tooth 245 extending outwardly from the circular periphery so that as the cam shaft rotates, the tooth 245 engages the roller 243 to move the rear bender slide to the right in Fig. 23. A retractile coil spring 246, Fig. 25, connects the slide to the frame to hold the roller 243 against the cam and return the slide to the left to its normal position. A flange 247 extends downwardly from the cap plate 248 behind the rack 240 to form a bearing and guide for the rack, and said flange also extends between the extreme end of the plate 239 and the rack to form a bearing for the plate. The cap 248 is placed on top of the slide and screwed to the frame. An idler pinion 249 is mounted upon a trunnion secured in the frame and is in mesh with the rack 240. An elongated bearing 250, Fig. 34, extends downwardly from the forward end of the arm 242, the vertical opening through said bearing being square or angular, and there being a horizontal slot 251 from the lower end of the bearing in its rear side. The reciprocating post 252 is square or angular and slidingly mounted in the bearing 250. A roller 253 is arranged upon a pin extending from the post 252 through the slot 251, said roller operating in a recess 254 in the vibrating bar 232, so that as the bar is moved up and down the post 252 is reciprocated in the bearing 250. A pin 255 is carried by an arm extending forwardly from the upper end of the post 252, and a retractile coil spring 256 is attached to this pin. A cam 257 is carried by the upper end of the post 252, the upper face of the cam being horizontally flat. The rear bender jaw 258 is recessed to receive the folded binding and has a cam knuckle 259, Fig. 22, at its forward end to engage in the corresponding bender bearing 180, said knuckle being above the plane of the binding. The jaw 258 is upon one side of a plate having a recess 260 in its upper face, and a slotted vertical bearing 261 at its center. A shouldered screw 262 is inserted downwardly through the bearing 261 with its head in the recess 260 and screw-seated in the upper end of the post 252, the shoulder of the screw being jammed against the post so as to leave the plate free to move to the extent of the bearing 261. A guide pin 263 extends downwardly from the jaw to engage the vertical internal face of the cam 257, said cam face being nearly concentric to the knuckle cam 259. The outer face of the jaw plate is segmental in plan and concave in cross-section to form the spring bearing 264, and the end of the spring 256 is placed in this bearing and connected to the rear end of the jaw plate, the tension of the spring being exerted to hold the jaw in its transverse position. A guide 265 is mounted in position to support the free outer end of the binding as it swings from its longitudinal position to its transverse position under the influence of the jaw 205, and while the binding metal is thus swinging the jaw 258 is depressed by the action of the pivoted bender frame so that the binding passes above the jaw. As soon as the binding is in position against the side of the anvil the jaw 258 is elevated, the rear slide moved by the action of the cam tooth until the jaw is brought against the binding, and the cam knuckle 259 brought into the bender bearing 180. The continued action of the cam tooth moving the slide causes the jaw to swing against the tension of the spring 256 in a line concentric to the cam knuckle 259, thereby folding the end of the binding against the rear side of the anvil, as shown in dotted lines in Fig. 25.

A second rear bender slide 266 is mounted to slide in the frame parallel with the first rear bender slide. This slide carries a rack 267 which is in mesh with the idler pinion 249, the cap plate 248 overlapping one edge of the slide, and the cap plate 268 overlapping the other edge of the slide. A second elongated bearing 269 extends downwardly from the inner end of the slide 266, said second bearing being identical in construction with the bearing 250. A square or angular post 270 is mounted in the bearing 269 and carries a roller 271 to operate in the recess 272 of the longitudinal bar 232, so that as the bar vibrates up and down the post 270 is moved up and down. An arm 273 extends outwardly from the upper end of the post 270, and a stop 274 extends upwardly from the outer end of the arm. This arm 273 has a bender link 275 mounted upon the upper face thereof which is secured in position by the shouldered screw 276. A lug 277, Fig. 31, extends from the link 275 to engage the stop 274, and a retractile coil spring 278 connects the lug to the stop, the tension of the spring being exerted to hold the lug against the stop. The jaw carrier 279 is bifurcated and pivotally connected to the link 275, and the fourth bender jaw 280 is mounted beside the jaw carrier 279 and secured pivotally in position by the pin 281 at its forward end, there being a cam knuckle 282 at its forward end corresponding to the cam knuckle 259 to engage in the corresponding bender bearing 180. The free end of the jaw 280 is connected to the jaw carrier 279 by overlapping tongues 283 so that the said free end may vibrate up and down, the jaw turning upon the pivot 281. The face of the jaw is recessed to receive the binding and like the recess of the other parts receiving the lengthwise bent binding has a short projecting rib to assist in holding the binding thereto. A spring 284 connects the free end of the jaw to the jaw carrier 279, the tension of the spring being exerted to hold the jaw in its normal elevated position. A spring 285 connects the forward end of the jaw carrier 279 to the opposite end of the link 275, the tension of said spring being exerted to hold the opposite end of the jaw carrier 279 against a stop 286 upon the link 275, thereby holding the jaw 280 normally in a straight transverse line. A guide plate 287 is secured to the link 275 to guide the end of the binding over the jaw 280, said jaw being depressed when the binding is swung against the anvil by the jaw 206. The action of the longitudinal bar 232 depresses and raises the jaw 280 simultaneously with the depressing and raising of the jaw 258. After the binding has been swung against the anvil by the jaw 206 the jaw 280 is elevated, and then the slide 266 moving to the left brings the cam knuckle 282 against the bearing 180, and the continued operation of the slide compresses the spring 285 and swings the jaw 280 against the rear side of the anvil as shown in dotted lines in Fig. 25. A second guide plate 287' is secured to the cap plate 248 to guide the extreme outer end of the binding as it is swung by the jaw 280, said jaw having a cut-away portion 289 at the extreme rear end thereof. The first end of the binding is bent against the rear face of the clenching anvil by the jaw 258, and then the second end is brought into place within the first end so that the two ends overlap by the jaw 280 and the overlapped portions are made to lie substantially flush and in line with the main body of the binding.

As means for overlapping the ends of the binding, I provide the mechanism L. This mechanism comprises means whereby the jaw 280 is mounted to vibrate the spring 284 for holding the vibrating end of the jaw in its normal elevated position, and the deflector cam 290 carried by the lower end of the rear one of the clenching levers; the cam face being inclined as shown in Figs. 35 and 36, so that when the jaw 280 swings toward the rear face of the anvil, as shown in dotted lines in Fig. 25, the extreme end of the jaw will strike the inclined face of the cam 290 as shown in dotted lines in Fig. 36, and by said inclined face the jaw will be deflected downwardly as shown in Fig. 35 until the jaw passes the point of the cam face, at which time the second end of the binding is under the first end of the binding. The tension of the spring 284 will now raise the jaw vertically inside of the bar 290, thereby bringing the second end of the binding to a position within the first end of the binding, as shown in Fig. 36, and then the continued action of the machine causes the slide 266 to move backwardly; thereby withdrawing the jaw 280 lengthwise from the cam 290, and as soon as the jaw is free of the cam the spring 285 will return it to its normal position.

The mechanism M for holding the binding upon the anvil is shown in detail in Figs. 25, 29, 30 and 32. A retaining pawl 290ª is yieldingly and pivotally mounted in position to ride over the binding and drop down behind the binding when the binding is carried against the face of the anvil by the jaw 206, so as to hold that end of the binding from being withdrawn from the other overlapping end when the slide 266 moves backwardly. In mounting the retaining pawl 290ª a plate 290ᵇ is attached to one of the clenching levers to be referred to hereafter. The retaining pawl 290ª is pivotally connected between ears extending downwardly from the plate, and a retractile coil spring 290ᶜ connects the upper end of the retaining pawl to the lever, as shown in Fig. 29.

A sleeve 291 extends upwardly through the central opening 292 of the anvil J, and a plate 293 is hinged to this sleeve, said plate vibrating directly above the anvil, and the holding finger 294 extends backwardly from the plate and downwardly to press the binding against the anvil when the plate is in its lower position, said finger being raised at the time the binding is folded and the ends overlapped. A retractile spring 295 connects to a pin below the anvil and is carried therewith and extends upwardly through an opening in the anvil and through the plate 293, and is connected to the plate. The tension of the spring is exerted to hold the finger 294 in position to hold the overlapped binding upon the anvil. Mounted upon a pivot above the anvil is a latch 296 which extends downwardly through the anvil J, there being a latch tooth 297 upon the latch to engage the arm 298 upon the plate and hold the finger 294 elevated so that the binding may be swung into place and overlapped against the anvil. This latch is adapted to be engaged by a pin 299, Fig. 42, which is recessed upon one side and mounted horizontally in position to engage the latch tooth 297. The pin extends beyond the rear face of the anvil and is held in place and allowed to reciprocate by the screw 300 screw-seated in the anvil with its point in the recess of the pin, so that when the jaw 258 bends the binding against the anvil, the jaw will strike the pin 299 and press the lower end of the latch inwardly to disengage the tooth 297 from the arm 298 and allow the finger 294 to be pulled downwardly by the spring 285 and grip and hold the binding in place. This operation takes place before the second end of the binding is brought into place, the object being to hold the first end of the binding securely while the second end of the binding is brought up into the first end. The coil spring 301 connected to the upper end of the latch 296 above the pivot holds the latch tooth 297 yieldingly in engagement with the arm 298. The completed binding is shown in plan in Fig. 32 and held upon the anvil ready to be applied to the body material of which the basket or box is made. In bending the binding around the anvil the corners 178 are vertical to receive the binding, and the two sides of the binding are bent together at the corners only leaving the edges of the folded binding open between the corners so that the edges of the body material may be inserted.

While the metal binding is being formed and supported on the anvil, the box material in the form of shooks is being picked up from suitable magazines and automatically removed from the magazines and placed into a die carrier 302 so that the shooks will lie crosswise and be properly supported in the die carrier. The feeding mechanism for the shooks as well as the means for forming the shooks into a box body are not claimed specifically herein and only that part of the mechanism which forms the shooks in the box body is specially described as such means serves in a measure to assist in removing the metal binding from the anvil about which it is formed, and certain parts thereof coöperate with the means by which the binding may be clenched or applied to the box body or other object.

The mechanism Q in the form of dies for forming the boxes is shown in Figs. 1, 2, 5, 42 to 45. A shaft 303 is mounted vertically in the frame a and carries a four-way intermittent spur gear 304 upon its lower end in mesh with the intermittent driver 305. The die carrier 302 is fixed upon the upper end of the shaft 303 above the frame and may rest upon suitable ball bearings, said carrier being provided with four shook receivers and dies to adapt the machine to receive shooks at one part, form other shooks at another part and simultaneously discharge completed boxes from another part of the carrier. The dies are arranged in the form of squares located at equal distances from the shaft 303 and equal distances apart, and the vertical openings in the dies being of the size and shape of the proposed box. Spring fingers 306 extend upwardly at the four sides of each die to engage the ends of the shooks to centralize the shooks relative to the die and snap over the ends of the shooks and hold them in the die while the picker plate is retreating, and similar spring fingers 306ª project upwardly adjacent the fingers 306 to engage the side edges of the shooks and assist in holding and registering the shooks.

The mechanism S in the form of a punch to coöperate with the dies for forming the boxes is shown in detail in Figs. 1 and 42 to 45. A slide-way is formed in the frame a to receive the punch slide 307, said slide being provided with a gib and being held in place by suitable caps. A socket 308, Fig. 1, extends from the slide between the caps, and the free end of the lever 309 extends into this socket, said lever being connected to the frame at its other end and operated by a cam 310. The cam 310 is fixed upon the upper end of the cam shaft 36, and a cam roller is mounted upon a trunnion extending from the central portion of the lever 309 and is operated by the cam 310 so that as the cam shaft rotates the lever 309 is vibrated to move the slide 307 up and down. A tubular neck 311 extends downwardly from the slide 307 and the punch shank 312 is removably mounted in this tubular neck by set screws 313. The lower part of the punch shank is made tubular to receive the expansive coil spring 314. A second punch shank 315 is slidingly mounted in the lower end of the bore of the tubular punch shank 312 and bears against the spring, and a pin 316 is fixed in this second shank with its ends extending into slots 317 in the first-mentioned shank so as to allow the second shank to slide up and down to the extent of the slots 317, the pressure of the spring 314 being exerted to hold the second shank in its lower portion, as shown in Fig. 43. A sleeve 318 is slidingly mounted upon the shank 312 below the lower end of the neck 311, there being an internal shoulder 319 upon the sleeve to engage the external shoulder 320 upon the shank to limit the downward motion of the sleeve, and there being a spring seat 321 around the periphery of the sleeve to receive the expansive coil spring 322. A spanner nut 323 is screw-seated in the lower end of the sleeve 318 below the shoulder 320 to form a bearing between the lower end of the sleeve and the lower end of the shank. The clencher head 324 is fixed upon the upper end of the shank below the tubular neck 311 and forms a seat for the upper end of the spring 322.

The sleeve 291 is slidingly mounted upon the extreme lower end of the shank 312. This sleeve 291 is formed integral with and projects upwardly from the anvil-supporting plate 325, and the vertical key 326, Fig. 39, is inserted to hold the sleeve 291 against rotation upon the shank. Posts 327 and 328 are inserted downwardly through the anvil and adjustably screw-seated in the plate 325 at diagonally opposite corners, there being a shoulder 329 upon each post to engage upon the anvil J so that when the posts are screwed down tight the anvil is held securely to the plate. Expansive coil springs 330 and 331 are mounted upon the posts, and nuts 332 and 333 are fixed upon the upper ends of the posts to form seats for the upper ends of the springs. An adjustable stop 334 is crew-seated in the frame a and held adjustably in position, the lower end of the stop being in position to engage the upper end of the post 328 and limit its upward movement. A similar post 335 has its lower end in position to engage the upper end of the post 327 and limit its upward movement.

A plunger base 336 is formed integral with the lower end of the sleeve 318 and forms a seat for the lower ends of the springs 330 and 331, the tension of the springs being exerted to hold the anvil in its elevated position, as shown in Fig. 43. The four levers 337 are mounted upon pivots 338 between ears extending from the plunger base 336, and the hardened plunger hammers 339 are carried by the lower ends of the levers 337 in position to engage and clench the binding upon the edge of the box. Links 340 connect the upper ends of the levers 337 to the clencher head 324 so that as the clencher base slides upwardly relative to the head, the upper ends of the levers are thrown outwardly to bring the hammers 339 against the binding, as shown in Fig. 45. The lower end of the punch is formed by a square plate 340ª the size of the inside dimension of the bottom of the box to be formed, and a wall 341 extends upwardly from the edges of the plate. The lower end of the second punch shank 315 is reduced in size and tapered to fit tightly in a vertical opening in the center of the plate 340ª, and a key 342 is inserted to hold the plate against rotation, and a screw 343 is inserted upwardly through the plate 340ª into the second shank to hold the plate securely in position upon the shank.

Pivot blocks 344 are secured to the corners of the anvil-supporting plate 325 by means of screws, there being two pivot blocks at each corner, and adjustable guide plates 345 are mounted upon the pivots 346 extending from the pivot blocks, there being a guide plate for each of the four sides of the box. An opening 347 is bored into each side of the anvil-supporting plate 325. An adjustable spring seat 348 is formed at the bottom of each opening by inserting a screw, and an expansive coil spring 349 is placed in the opening between the spring seat 348 and the guide plate, said spring being above the pivot so as to force the upper edge of the guide plate outwardly. An opening 350 is formed through the guide plate for the insertion of a screw-driver for the adjustment of the spring seat 348, said opening being smaller than the spring. A stop bearing 351 is formed adjacent to the spring by extending the guide plate inwardly and recessing its outer face, and a stop screw 352 is inserted through the guide plate and screw-seated in the plate 325 with its head in the recess so as to adjust and limit the outward swing of the upper edge of the guide plate, the object being to locate the guide plates so that they will guide the upper edges of the shooks into the open binding, as shown in Figs. 44 and 45. Cap screws 353 connect the anvil to the supporting plate 325, said cap screws being arranged at diagonal corners, as shown in Fig. 39.

The shooks are laid crosswise in the dies by the pneumatic pickers, and at each operation of the pickers the dies are moved one step or a quarter-turn by the intermittent gear mechanism, so that the die containing the two cross shooks is by the next step carried under the punch, as shown in Fig. 42. Then the continued operation of the machine places the binding upon the anvil, and then moves the slide 307 downwardly until the punch plate 340ª presses the shooks downwardly into the die and turns the ends of the shooks upwardly to form the sides of the box, as shown in Fig. 44.

The mechanism Z for registering or evening the ends of the body material is shown in the lower parts of Figs. 42, 44 and 45. A square plate 354 is held in an elevated position relative to the frame a by brackets 355 and 356. A square hinge plate 357 is mounted upon the plate 354 with a sleeve 357ª extending downwardly through the center of the plate 354 and a nut 358 upon its lower end to hold the parts together. Wings 359 are hinged to the four edges of the plate 357, and springs 360 are inserted between the wings and the plate 354 to hold the wings normally elevated. These wings 359 and the plate 357 form a separable bottom or member for the dies as they are successively presented under the punch to form the box body. A rubber sucker 361 is placed upon the plate 357 and extends over the hinge pins onto the wings 359, and a tubular bolt 362 has a flat head and is inserted downwardly through the sleeve 357ª with the head upon the sucker 361, and a nut 363 upon the lower end of this tubular bolt holds the parts in place. The tubular bolt 362 is connected to suitable exhausting means by which suction is created causing the sucker 361 to stick to the bottom of the box and hold the box in the die while the punch plate is being withdrawn. The punch mechanism presses the bottom of the box down upon the wings 359, and the continued action brings the binding down upon the upturned edges of the shooks; and if one of the edges is higher than the other edges the corresponding wing 359 will yield so that when the box is pressed firmly into the open binding the upper edges will be registered, and when the binding is clenched tightly upon the edges they will be held in registration.

The mechanism Z² for stripping the box from the punch is shown in Figs. 46 to 50, this mechanism being omitted from Figs. 42, 43 and 45. The stripper base plate 364 is secured against the lower face of the frame a, said plate having a central opening through which the punch mechanism operates. At each of the four corners of the plate 364 is a vertical bearing 365 registering with an opening 366 through the frame a. Tubular sleeves 367 are inserted upwardly into the bearings 365 and held removably in position by set screws 368. The lower ends of the sleeves are transversely slotted upon one side to form the pawl openings 369. Bearing blocks 370 are adjustably mounted upon the sleeves 367 by set screws 371, and the pawl-bearings 372 extend outwardly from the bearing blocks. The bearings 372 are bifurcated to receive the pawl levers 373, said levers being held in place by pins 374, so that the pawl teeth 375 pass into the slots 369. Retractile coil springs 376 connect the pawl levers 373 to the lower ends of the sleeves 367 so as to pull the pawl teeth 375 into the slots 369. The levers 373 are connected together in pairs by the shafts 377 and 378, and rollers 379 and 380 are fixed upon the shafts in position to engage the corresponding clenching levers 337 when the punch is being withdrawn from the box. An endwise reciprocating stripper rod 381 is mounted in each sleeve 367. A bearing block 382 is secured in a plane across each corner of the anvil against the lower face of the bearings supporting the clenching levers, and the lower ends of the stripper rods 381 are slidingly mounted in these bearing blocks 382, there being a V-shaped vertical recess 383, Fig. 50, in each of the stripper rods to fit the corners of the anvil.

A pin 384 is inserted into the clencher lever bearing, one for each stripper rod 381, and a similar pin 385 is fixed in the lower end of the stripper rod below the bearing block 382. A retractile coil spring 386 connects the pins 384 and 385 together, the tension of the spring being exerted to move the stripper rod upwardly. The lower ends of the stripper rods 381 are in position to engage the corners of the metal binding, and when the punch plate moves downwardly into the die to form the box, the bearing blocks 382 engage the pins 385 and move the stripper rods 381 downwardly into engagement with the corners of the binding. Then the pawl teeth 385 snap inwardly above the upper ends of the stripper rods and hold the stripper rods down upon the corners of the binding. At this time the rollers 379 and 380 are out of engagement with the clencher levers, as shown in Fig. 48. Then as the punch slide is operated to retreat the punching mechanism and its coöperating parts to withdraw the punch from the box, the stripper rods are held rigidly against the corners of the binding until the punch retreats, thereby stripping the box from the punch; and then the continued action of retreating the punch brings the clenching levers into engagement with the rollers 379 and 380, as shown in Fig. 49, and the cam action of the rollers upon the clenching levers forces the pawl teeth 375 out of engagement with the stripper rods 381 and the springs 386 snap the stripper rods upwardly into their normal positions.

It will be understood that many changes may be made in the arrangement of parts and the details of construction without departing from the spirit of my invention.

Having thus described my invention, I claim as new and desire to secure by Letters Patent:—

1. The combination of means for supporting a long strip of binding metal in a roll-like form, means for drawing the binding metal from the roll and for providing a slack portion in said binding metal, means for positively feeding a determined length of the binding metal, means for adjusting said feeding means to vary the extent of feed, means for folding the binding metal lengthwise substantially V-shaped in cross-section, means for tilting the folded binding metal to change its position, means for cutting the binding metal transversely, means for reforming one end of the binding metal, a rectangular anvil, means for moving the cut and folded binding metal against the anvil and bending the binding metal about the anvil on three sides thereof, independent means for bending the binding metal about the remaining side of the anvil and for causing the ends thereof to overlap, means for holding the binding metal to the anvil, means for releasing said holding means, and means applying the folded and bent binding to an object.

2. The combination of means for supporting a long strip of binding metal, means for positively feeding a determined length of the binding metal, means for folding the binding metal lengthwise, means for tilting the folded binding metal to change its position, means for cutting the metal binding transversely, means for reforming one end of the binding metal, an anvil, means for moving the cut and folded binding metal against the anvil and bending the binding metal about a part of the anvil, independent means for bending the binding metal about the remaining portion of the anvil and for causing the ends thereof to overlap, means for holding the binding metal to the anvil, means for releasing said holding means, and means applying the folded and bent binding metal to an object.

3. The combination of means for supporting binding metal, means for folding the binding metal lengthwise, means for tilting the folded binding metal to change its position, means for cutting the binding metal transversely, an anvil, means for moving the cut and folded binding metal against the anvil and bending the binding metal about a portion of the anvil, and independent means for bending the binding metal about the remaining portion of the anvil.

4. The combination of means for supporting a binding metal, means for positively feeding a determined length of binding metal, means for adjusting said feeding means to vary the extent of feed, means for folding the binding metal lengthwise substantially V-shaped in cross-section, means for cutting the binding metal transversely, means for reforming the binding metal, a rectangular anvil, means for moving the cut and folded binding metal against the anvil and bending the binding metal about the anvil on three sides thereof, independent means for bending the binding metal about the remaining side of the anvil and for causing the ends thereof to overlap, means for holding the binding metal to the anvil, means for releasing said holding means, and means for applying the bent binding to a box body.

5. The combination of means for supporting a long strip of binding metal, means for feeding the binding metal, means for folding the binding metal lengthwise substantially V-shaped in cross-section, means for cutting the binding metal transversely, means for reforming one end of the binding metal, an anvil, means for bending the cut and folded binding metal about the anvil on three sides thereof, independent means for bending the binding metal about the remaining side of the anvil and for causing the ends thereof to overlap, means for holding the binding metal to the anvil, and means for releasing said holding means.

6. The combination of means for supporting a strip of metal binding, means for positively feeding a determined length of the binding metal, means for adjusting said feeding means to vary the extent of feed, means for folding the binding metal lengthwise substantially V-shaped in cross-section, means for cutting the binding metal transversely, means for reforming one end of the binding metal, a rectangular anvil, means for moving the cut and folded metal binding against the anvil and bending the binding metal about the anvil on three sides thereof, independent means for bending the binding metal about the remaining side of the anvil and for causing the ends thereof to overlap, and means for removing the binding metal from the anvil.

7. The combination of means for supporting a long strip of metal binding in a roll-like form, means for positively feeding a determined length of metal means for adjusting said feeding means to vary the extent of feed, means for folding the binding metal lengthwise substantially V-shaped in cross-section, means for tilting the bent metal to change its position, means for cutting the binding metal transversely, means for reforming one end of the binding metal, a rectangular anvil, and means for bending the cut and folded binding metal about the anvil.

8. The combination of means for supporting a roll of binding metal in the form of a strip, a belt adapted to engage the roll for advancing the binding metal, means for rotating the belt, means for yieldingly forcing the belt against the roll, means for positively feeding the binding metal, means for creating a slack in the binding metal intermediate the roll and feeding means, and means for bending the binding metal lengthwise and transversely.

9. The combination of means for supporting a roll of binding metal in the form of a strip, a belt adapted to engage the roll for advancing the binding metal, means for rotating the belt, a weight for yieldingly forcing the belt against the roll, means for positively feeding the binding metal, and means for bending the binding metal lengthwise and transversely.

10. The combination of means for supporting a roll of binding metal in the form of a strip, means for feeding the strip, an anvil, and means for folding the strip lengthwise and for bending the same angularly and transversely at a plurality of separate points about the anvil.

11. The combination of means for supporting binding metal, means for folding the binding metal lengthwise, means for cutting the binding metal, means for reforming the binding metal, an anvil, and means for bending the folded binding metal transversely about the anvil.

12. The combination of means for supporting binding metal, a belt adapted to engage the binding metal for advancing the metal, means for rotating the belt, means for yieldingly forcing the belt against the binding metal, means for positively feeding the binding metal, means for providing a slack in the binding metal adjacent to the feeding means, and means for bending the binding metal lengthwise and transversely.

13. The combination of means for supporting a roll of binding metal in the form of a strip, a belt adapted to engage the roll for advancing the metal, means for rotating the belt, and means for yieldingly forcing the belt against the roll.

14. The combination of means for supporting a binding metal strip in the form of a roll, means for advancing the binding metal from the roll, a large roll, two small rolls yieldingly forcing the binding metal against the large roll and serving to draw and feed the binding metal, and means for feeding a determined quantity of the binding metal after leaving said rolls and located forward of the rolls.

15. The combination of means for supporting binding metal, a large roll, two small rolls yieldingly forcing the binding metal against the large roll and serving to draw and feed the binding metal, means for feeding a determined quantity of the binding metal after leaving the rolls and located forward of the rolls, and means for bending the binding metal lengthwise and transversely.

16. The combination of means for supporting binding metal in the form of a roll, feeding means, a substantially rectangular anvil, and means for bending the binding metal lengthwise and transversely at a plurality of points about the edge of the anvil.

17. The combination with means for supporting binding metal, a large roll, two small rolls yieldingly forcing the binding metal against the large roll and serving to feed the binding metal, means for folding the binding metal lengthwise, an anvil, and means for bending the binding metal transversely about the anvil.

18. In a box-making machine, the combination of means for feeding a binding metal, means receiving the binding metal from the feeding means and bending the binding metal lengthwise and transversely, and means for applying the binding metal entirely about one edge of an object without shifting the position of the binding metal and while held by a part of the transverse bending means.

19. The combination of means for supporting a long strip of binding metal, means for bending the strip lengthwise and transversely, together with feeding means for the strip comprising eccentric sleeves arranged transversely of the machine and in parallel relation, interlocking teeth for connecting the sleeves together, compression shafts rotatably mounted in the eccentric sleeves, gears connecting the shafts together, feed rolls held to the shafts, means for driving the shafts, and means for operating the eccentric sleeves.

20. The combination of means for supporting binding metal, means for bending the strip lengthwise and transversely, feeding means for the strip comprising eccentric sleeves arranged transversely of the machine and in parallel relation, compression shafts rotatably mounted in the eccentric sleeves, gears connecting the shafts together, feed rolls held to the shafts, means for driving the shafts, and means for operating the eccentric sleeves, and guides located on opposite sides of the rolls.

21. The combination of means for supporting a strip of binding metal, means for bending the binding metal lengthwise and transversely, together with feeding means for the binding metal comprising eccentric sleeves arranged transversely of the machine and in parallel relation, rolls rotatably mounted in the sleeves, and means for varying the feed of the rolls.

22. The combination of means for supporting a long strip of binding metal, means for bending the strip lengthwise and transversely, together with feeding means for the strip comprising eccentric sleeves arranged transversely of the machine and in parallel relation, interlocking teeth for connecting the sleeves together, feed rolls mounted on the sleeves, means for driving the rolls, and means for moving the eccentric sleeves.

23. The combination of means for supporting a strip of binding metal, means for bending the strip lengthwise and transversely, together with feeding means for the strip comprising eccentrically mounted compression shafts, gears connecting the shafts together, feed rolls held to the shafts, and means for driving the shafts.

24. The combination of eccentrically mounted shafts, feed rolls carried by said shafts, a lever for moving the rolls toward each other, a spring tending to force the rolls apart, a cam, and connections between the cam and lever for operating the latter, said cam having an adjustable part to vary the throw of the lever and consequently the feed.

25. The combination of eccentrically mounted shafts, feed rolls carried by said shafts, a lever for moving the rolls toward each other, a spring tending to force the rolls apart, a cam, and means for varying the feed of the rolls.

26. In a box-making machine, the combination of means for supporting and feeding a metal strip, relatively movable members for folding the strip lengthwise, means for bending the folded strip transversely substantially rectangular in form, and means coöperating with both the lengthwise folding means and the transverse bending means to direct the metal strip from one means to the other.

27. The combination of a stationary bar-like member having a channel along one edge thereof, a movable bar-like member having a rib lengthwise thereof and adapted to support a narrow metal strip, means for reciprocating said movable member to fold the strip lengthwise thereof and while folding bodily move the strip into the channel of the stationary member, ejecting means movable in the stationary member, and centering and guiding members for alining and holding the edges of the strip during the lengthwise folding operation.

28. The combination of a stationary bar-like member having a channel along one edge thereof, a movable bar-like member adapted to support a narrow metal strip, means for reciprocating said movable member to fold the strip lengthwise thereof and while folding bodily move the strip into the channel of the stationary member, and ejecting means movable in the stationary member.

29. The combination of a bar-like member having a channel along one edge thereof, a second bar-like member, means for moving one member relatively to the other to fold a metal strip lengthwise thereof and while folding bodily move the strip into the channel of the first mentioned member, and centering and guiding members for alining the strip during the lengthwise folding operation.

30. The combination of means for supporting and feeding binding metal, a stationary folding member having a groove lengthwise thereof on its under side, a reciprocatory folding member having a blade-like part to force the strip into the groove and fold the binding metal lengthwise, and means for forcing the folded binding metal free of the folding members, means for bending the binding metal transversely, and means for applying the binding metal along the entire edge of an object.

31. The combination of means for supporting and feeding a binding metal strip, a stationary folding member having a groove lengthwise thereof on its under side, a reciprocatory folding member having a blade-like part to force the strip into the groove, movable centering members for alining the strip lengthwise of the folding members, and means for bending the folded strip transversely.

32. In a box-making machine, the combination of means for supporting and feeding a binding metal strip, a stationary folding member having a groove lengthwise thereof on its under side, a vertically reciprocatory folding member having a blade-like part to force the strip into the groove, and means receiving the folded metal strip from the folding members and bending said folded strip transversely.

33. The combination of relatively movable folding members adapted to fold a strip of binding metal lengthwise, and oppositely arranged and horizontally movable bar-like centering members, means for ejecting the folded binding metal, and means for bending the folded binding metal transversely.

34. The combination of a stationary bar-like and grooved folding member, a movable member having a blade-like part adapted to force a metal strip to fold said strip lengthwise of said folding members, ejecting means, means for operating the ejecting means, means for reciprocating the movable folding member, means for cutting the metal strip, means for reforming one end of the strip, and means for bending the strip transversely.

35. The combination of a stationary bar-like and grooved folding member, a reciprocatory member having a blade-like part adapted to force a metal strip to fold said strip lengthwise of said folding members, ejecting means, means for operating the ejecting means, means for reciprocating the movable folding member, and means for bending the metal strip transversely.

36. The combination of a stationary bar-like and grooved folding member, a vertically movable member having a blade-like part adapted to force a metal strip to fold said strip lengthwise of said folding members, centering means, ejecting means, means for operating the ejecting means, means for reciprocating the movable folding member, and means for bending the strip at substantially right angles to the lengthwise fold.

37. The combination of a stationary bar-like and grooved folding member, a movable member having a blade-like part adapted to force a metal strip to fold said strip lengthwise of said folding members, ejecting means, means for operating the ejecting means, means for reciprocating the movable folding member, cutting means, means for reforming one end of the strip, and means for bending the strip transversely and applying the same to an object.

38. The combination of means for supporting a strip of binding metal, bar-like stationary and movable folding members adapted to fold the metal lengthwise, ejecting means, rock shafts, links connecting the rock shafts to the movable folding member, rock arms connected to the shafts, a rod connected to the arms, means for operating the rod, and means movable with the arms adapted to operate the ejecting means.

39. The combination of means for supporting a strip of binding metal, stationary and movable folding members adapted to fold the binding metal lengthwise, ejecting means, rock shafts, links connecting the rock shafts to the movable folding member, rock arms connected to the shafts, means for operating the rock arms, and means for bending the strip transversely and angularly with respect to its lengthwise fold.

40. The combination of relatively movable folding members adapted to fold a strip of metal substantially V-shaped in cross-section and lengthwise of the strip, rods adapted to force the folded strip of metal free of said members, a rock shaft, arms connected to said shaft, means for moving the shaft and arms, and means for bending the strip at right angles to the lengthwise fold.

41. The combination of relatively movable folding members adapted to fold a strip of metal lengthwise thereof, vertically movable rods adapted to force the folded strip of metal free of said members, means for operating said rods, and means for bending the strip at right angles to the lengthwise fold.

42. The combination of relatively movable folding members, rods adapted to force a folded strip of metal free of said members, arms connected to said rods, means for moving the arms, and means for bending the folded metal strip transversely and for applying the said strip to one edge of an object.

43. The combination of folding members adapted to fold a metal strip lengthwise thereof, two opposed centering bars for alining the strip along the folding members, rods having an eccentric connection with the centering bars, and means for moving the rods in unison.

44. The combination of folding members adapted to fold a metal strip lengthwise thereof, two opposed centering bars for alining the strip along the folding members, rods having an eccentric connection with the centering bars, and means for moving the rods in unison, cutting means, means for reforming the cut strip at one end, and means for bending the folded strip transversely.

45. The combination of means for folding a strip lengthwise, means for tilting the strip, and means for bending the folded strip transversely.

46. The combination of means for folding a strip of binding metal lengthwise, means for tilting the binding metal, and means for bending the folded strip transversely and for applying the same to an object.

47. The combination of means for folding a strip of binding metal lengthwise substantially V-shaped in cross-section, means for bending the strip transversely, and tilting means comprising grooved and ribbed rollers coöperating to shift the position of the folded strip before bending transversely.

48. The combination of means for folding a strip of binding metal lengthwise, means for bending the strip transversely, grooved guides for the binding metal, tilting means comprising grooved and ribbed rollers coöperating to shift the position of the folded strip before bending transversely, and means for applying the folded and bent strip along one entire edge of an object.

49. The combination of means for folding binding metal lengthwise in substantially V-shaped form, means for bending the binding metal transversely substantially rectangular, and tilting means comprising grooved and ribbed rollers coöperating to shift the position of the folded strip before bending transversely.

50. The combination of means for folding a strip of binding metal lengthwise, means for tilting the folded binding metal, means for cutting the binding metal transversely, means for reforming the cut binding metal, means for bending the binding metal transversely, and means for applying the folded and bent binding metal to an object.

51. The combination of means for folding a strip of metal lengthwise, means for tilting the folded strip, means for cutting the strip transversely, means for bending the strip transversely, and means for applying the strip to an object.

52. The combination of means for folding a strip of metal lengthwise, means for cutting the strip transversely, means for reforming the cut strip, and means for bending the strip transversely.

53. The combination of means for bending binding metal lengthwise and transversely, and means for reforming the binding metal by expanding the same to permit the ends to overlap and lie substantially flush.

54. The combination of means for bending binding metal lengthwise and transversely, means for reforming one end of the binding metal by expanding the same to permit the ends to overlap and lie substantially flush, and means for applying the binding metal to an object.

55. The combination of means for bending a metal strip lengthwise and transversely, a sliding block, two relatively movable reformer levers, one having a grooved die and the other a die having a tongue and adapted to enlarge one end of the folded strip, and a toggle connection between the levers and the sliding block.

56. The combination of means for bending a binding metal strip lengthwise and transversely, two relatively movable reformer levers, one having a grooved die and the other a die having a tongue and adapted to enlarge one end of the folded strip, and means for operating said lever.

57. The combination of means for bending a binding metal strip lengthwise and transversely, a sliding block, two relatively movable reformer levers, one having a grooved die and the other a die having a tongue and adapted to enlarge one end of the folded strip, connections between the levers and the sliding block, and means for bending the binding metal transversely and for causing the ends of the bent strip to overlap.

58. The combination of means for bending a binding metal strip lengthwise and transversely, a sliding block, means for operating the block, a reformer member having a die, a second member pivoted to the other member and having a die to coöperate with the first-mentioned die, toggle links connecting the ends of said members together opposite the die, and means connecting the links to the sliding block.

59. The combination of means for bending a binding metal strip lengthwise and transversely, a reformer member having a die, a second member pivoted to the other member and having a die to coöperate with the first-mentioned die, and means for moving the dies toward or away from each other.

60. The combination of means for folding a metal strip, reforming dies for offsetting a part of the strip at its end to permit the ends of the strip to overlap and lie substantially flush when brought together, and a cutter blade acting in conjunction with one of said dies to cut the strip just before the completion of the operation of the dies.

61. The combination of means for folding a metal strip lengthwise, of a pivotally held cutter, means for operating the cutter to cut the folded strip transversely and means for bending the strip rectangular in form.

62. The combination of means for folding a metal strip lengthwise, a sliding block, a spring normally forcing the block in one direction, cam means for forcing the block in the opposite direction, a pivotally held lever, a cutter carried by said lever for cutting the strip transversely, and means operated by the sliding block to move the lever.

63. The combination of means for folding a metal strip lengthwise, a movable block, a spring normally forcing the block in one direction, means for forcing the block in the opposite direction, a pivotally held lever, a cutter carried by said lever for cutting the folded strip transversely, and means operated by said block to move the lever.

64. The combination of means for bending a metal strip lengthwise, means for bending the strip transversely, tilting means, guiding means located between the tilting means and the transverse bending means and having a lengthwise groove with a slightly raised rib serving to hold the strip detachably therein, and a movable retaining bar coöperating with said guiding means.

65. The combination of means for bending a metal strip lengthwise and transversely, tilting means, and guiding means having a lengthwise groove with a slightly raised rib serving to hold the strip detachably therein after being tilted.

66. The combination of means for bending a strip of binding metal lengthwise and transversely, guiding means, a shaft, arms secured to said shaft, a bar carried by the arms and adapted to coöperate with the guiding means to guide the strip, a spring tending normally to force the bar in one direction, and cam-actuated means for forcing the bar in the other direction.

67. The combination of means for bending a strip of binding metal lengthwise and transversely, tilting means, guiding means having a groove lengthwise thereof, and a movable bar adapted to coöperate with the guiding means to guide the strip.

68. In a box-making machine, the combination of means for folding a metal strip lengthwise, an anvil, means receiving the strip from the folding means and for carrying the strip bodily to the anvil laterally of the lengthwise folding, means for coöperating with the bodily carrying means for bending the strip about the anvil, and means for applying the strip to an object while held about the anvil.

69. In a box-making machine, the combination of means for folding a metal strip lengthwise, a rectangular anvil, means receiving the metal strip from the folding means and bending the strip transversely about the anvil, and means for applying the strip to an object while held by the anvil.

70. In a box-making machine, the combination of means for bending a metal strip lengthwise, a substantially rectangular anvil, means receiving the metal strip from the lengthwise bending means and guiding and feeding the strip adjacent to the anvil, means for bending the folded strip about the anvil to substantially close the bent strip at the corners and having the strip open between the corners, and means for forcing a part of an object into the open spaces of the strip and binding said strip to said object while held by the anvil.

71. In a box-making machine, the combination of means for bending a metal strip lengthwise, a substantially rectangular anvil, means for guiding and feeding the strip from the lengthwise bending means adjacent to the anvil, and means receiving the strip from the feeding means and bending the folded strip about the anvil to substantially close the bent strip at the corners and having the strip open between the corners.

72. The combination of means for bending a metal strip lengthwise, a substantially rectangular anvil, means receiving the strip from the lengthwise bending means and guiding and bodily moving the strip against the anvil, and means coöperating with the bodily moving means for bending the folded strip about the anvil.

73. The combination of means for bending a metal strip lengthwise, a substantially rectangular anvil having vertical clenching faces on all four sides forming shoulders above said faces and having corner pieces about which the strip may be bent, means for feeding the strip adjacent to the anvil, means for bending the strip about three of the sides of the anvil, independent means for folding the two ends of the strip about the remaining side of the anvil and for causing the ends of the strip to overlap, means for detachably holding the strip to the anvil, and means for applying the bent strip to an object to form a binding therefor.

74. The combination of means for bending a strip of binding metal lengthwise, a substantially rectangular anvil having vertical clenching faces on all four sides forming shoulders above said faces and having corner pieces about which the strip may be bent, means for feeding the strip adjacent to the anvil, means for bending the strip about three of the sides of the anvil, and independent means for folding the two ends of the strip about the remaining side of the anvil and for causing the ends of the strip to overlap.

75. The combination of means for bending a strip of binding metal lengthwise, a substantially rectangular anvil having corner pieces about which the strip may be bent, means for feeding the strip adjacent to the anvil, means for bending the strip about three of the sides of the anvil, and independent means for folding the two ends of the strip about the remaining side of the anvil and for causing the ends of the strip to overlap.

76. The combination of means for folding a metal strip lengthwise, an anvil having a plurality of sides, a bender frame for carrying the strip against the anvil, means mounted on the frame for bending the strip transversely about the anvil on three of its sides, and means for bending the strip about the remaining side of the anvil.

77. The combination of means for folding a metal strip lengthwise, an anvil having a plurality of sides, a bender frame for bodily carrying the strip against the anvil, and means for bending the strip transversely about the anvil.

78. The combination of a rectangular anvil having vertical clenching faces and provided with sockets at the corners, a bender frame movable toward the anvil and adapted to carry a metal strip therewith, two jaws mounted upon the bender frame and having parts adapted to engage the sockets of the anvil to act as pivots for the jaws and cause the jaws to move about the anvil and bend the strip partly about said anvil, two jaws adapted to receive the free ends of the strip and having parts to engage the other sockets of the anvil to act as pivots for said jaws, and means for actuating said jaws to bend the ends of the strip about one side of the anvil and to cause the ends of the strip to overlap.

79. The combination of a rectangular anvil having vertical clenching faces and provided with sockets at the corners, a bender frame movable toward the anvil and adapted to carry a metal strip therewith, two jaws mounted upon the bender frame and having parts adapted to engage the sockets of the anvil to act as pivots for the jaws and cause the jaws to move about the anvil, two jaws adapted to receive the free ends of the strip and having parts to engage the other sockets of the anvil to act as pivots for said jaws, means for actuating said jaws to bend the ends of the strip about one side of the anvil and to cause the ends of the strip to overlap, and corner pieces mounted on the anvil about which the strip is bent.

80. The combination of an anvil having a plurality of sides and having sockets at the corners, a bender frame movable toward the anvil and adapted to carry a metal strip therewith, two jaws mounted upon the bender frame and having parts adapted to engage the sockets of the anvil to act as pivots for the jaws and cause the jaws to move about the anvil and bend the strip about said anvil, and two bending jaws adapted to receive the free ends of the strip and having parts to engage the other sockets of the anvil to act as pivots for said jaws.

81. The combination of an anvil having vertical faces to form shoulders and provided with sockets at the corners, two bodily movable jaws adapted to carry a metal strip therewith and having parts adapted to engage the sockets of the anvil to act as pivots for the jaws and cause the jaws to move about the anvil and bend the strip partly about said anvil, and two bodily movable jaws adapted to receive the free ends of the strip and having parts to engage the other sockets of the anvil to act as pivots for said jaws.

82. The combination of means for folding a strip lengthwise, a substantially rectangular anvil, bodily movable and pivotally held jaws for bending the strip about a part of the anvil, and bodily movable and pivotally held jaws for bending the strip about the remainder of the anvil and causing the ends of the strip to overlap.

83. The combination of means for folding a strip lengthwise, an anvil, bodily movable and pivotally held jaws for bending the strip about a part of the anvil, and independent and bodily movable and pivotally held jaws for bending the strip about the remainder of the anvil.

84. The combination of an anvil, means for folding a metal strip lengthwise, bodily movable and pivotally held jaws for bending the strip transversely about a part of the anvil, and independent means for bending the strip about the remainder of the anvil.

85. The combination of means for folding a metal strip lengthwise, an anvil, and jaws adapted to have a pivotal connection with the anvil and bend the strip about said anvil.

86. The combination of means for folding a metal strip lengthwise, an anvil, and bodily movable jaws adapted to have a pivotal connection with the anvil and bend the strip about said anvil.

87. The combination of a substantially rectangular clenching anvil, means for feeding a binding metal as a single strip, and four bending jaws arranged to bend the metal binding about the anvil on four sides thereof.

88. The combination of a clenching anvil, means for feeding a metal binding, and four swinging bending jaws arranged to bend the binding metal about the anvil on four sides thereof, two of said jaws having a movement laterally of the swinging movement.

89. The combination of a substantially rectangular clenching anvil, four bending jaws arranged to bend the binding metal about the anvil on four sides thereof, and means for feeding the binding metal initially to two of the jaws, the two remaining jaws having an up-and-down movement in addition to their bending movement.

90. The combination of means for feeding a binding metal, and means including a plurality of jaws for bending the binding metal, a part of said jaws having a movement laterally of and in addition to the bending movement.

91. The combination of means for folding a strip lengthwise, an anvil, a bender frame, means for moving the bender frame, means carried by the frame and adapted to have a pivotal connection with the anvil to bend the strip about the anvil, a buffer carried by the frame, and a stop adapted to engage the buffer.

92. The combination of a bender frame, means for feeding a metal strip to the frame, links pivotally held to the frame and provided with fingers, stops adapted to engage the fingers, a substantially rectangular anvil having faces about which the strip is adapted to be bent and provided with sockets at the corners thereof, two jaws pivotally connected to the links, a central bender bar pivotally connecting the jaws together, said jaws having cams adjacent to the ends thereof adapted to engage certain of the anvil sockets to form pivots for the jaws, springs tending to force the jaws in one direction, stops for limiting the movement of the jaws, and means for bending the ends of the strip about the remaining side of the anvil and causing the ends to overlap.

93. The combination of a bender frame, means for feeding a metal strip to the frame, links pivotally held to the frame and provided with fingers, stops adapted to engage the fingers, a substantially rectangular anvil having faces about which the strip is adapted to be bent and provided with sockets at the corners thereof, two jaws pivotally connected to the links, a central bender bar pivotally connecting the jaws together, said jaws having cams adjacent to the ends thereof adapted to engage certain of the anvil sockets to form pivots for the jaws, springs tending to force the jaws in one direction, stops for limiting the movement of the jaws, and jaws for bending the ends of the strip about the remaining side of the anvil and causing the ends to overlap.

94. The combination of a bender frame, means for feeding a metal strip to the frame, a substantially rectangular anvil having faces about which the strip is adapted to be bent and provided with sockets at the corners thereof, two pivotally held jaws, a central bender bar pivotally connecting the jaws together, said jaws having cams adjacent to the ends thereof adapted to engage certain of the anvil sockets to form pivots for the jaws, and means for bending the ends of the strip about the remaining side of the anvil and causing the ends to overlap.

95. The combination of a bender frame, means for feeding a metal strip to the frame, links pivotally held to the frame, a substantially rectangular anvil having faces about which the strip is adapted to be bent and provided with sockets at the corners thereof, two jaws pivotally connected to the links, a central bender bar pivotally connecting the jaws together, said jaws having cams adjacent to the ends thereof adapted to engage certain of the anvil sockets to form pivots for the jaws, and two jaws for bending the ends of the strip about the remaining side of the anvil.

96. The combination of means for folding a metal strip lengthwise, a rigid guide bar, a movable guide bar, an anvil, a bender frame movable toward and from the anvil, means for bending the strip about the anvil, yieldingly held retaining fingers for holding the folded strip in the bender frame, and means for automatically disengaging the fingers.

97. The combination of means for folding a metal strip lengthwise, a rigid guide bar, a movable guide bar, an anvil, a bender frame movable toward and from the anvil, means for bending the strip about the anvil, and means for temporarily holding the folded strip in the bender frame.

98. The combination of means for folding a metal strip lengthwise, an anvil, a bender frame movable toward and from the anvil, means for bending the strip about the anvil, and means for holding the folded strip in the bender frame.

99. The combination of means for folding a metal strip lengthwise, an anvil, two bender frames movable horizontally and at right angles to each other, and jaws pivotally connected to the frames and adapted to bend the strip about the anvil.

100. The combination of means for folding a metal strip lengthwise, a rectangular anvil, two bender frames movable at right angles to each other, and pivotally held jaws adapted to bend the strip about the anvil.

101. The combination of means for folding a metal strip lengthwise, a rectangular anvil, means for folding the strip about three sides of the anvil, and two swinging jaws adapted to fold the strip about the remaining side and one of said jaws having an up and down as well as a swinging movement to cause the ends of the strip to overlap.

102. The combination of means for folding a metal strip lengthwise, an anvil, and means including a jaw having an up and down as well as a swinging movement to bend the strip about the anvil and to cause the ends of the strip to overlap.

103. The combination of a substantially rectangular anvil, and four reciprocatory and swinging jaws adapted to bend a metal strip transversely about the edge of the anvil parallel to the plane of the strip.

104. The combination of a substantially rectangular anvil, and four reciprocatory and swinging jaws adapted to bend a metal strip transversely about the edge of the anvil parallel to the plane of the strip and arranged to operate in pairs.

105. The combination of means for folding a metal strip lengthwise, an anvil, means for folding the strip partly around the anvil, and two reciprocatory and swinging jaws adapted to bend the strip about the remainder of the anvil and to cause the ends to overlap.

106. The combination of means for folding a metal strip lengthwise, an anvil, means for folding the strip partly around the anvil, and two reciprocatory and swinging jaws adapted to bend the strip about the remainder of the anvil, one of said jaws having a lateral movement to cause the ends to overlap.

107. The combination of an anvil, means for bending a metal strip about a part of the anvil, two horizontally swinging jaws for bending the strip about the remainder of the anvil, and a swinging frame connected to one of the jaws to move the same up and down during its swinging movement.

108. The combination of an anvil, means for bending a metal strip about a part of the anvil, two horizontally bodily movable and swinging jaws for bending the strip about the remainder of the anvil, and a swinging frame connected to one of the jaws to move the same up and down during its swinging movement.

109. The combination with means for folding a strip lengthwise, a substantially rectangular anvil, two jaws having means to receive the strip and bend the same about a part of the anvil, two jaws for bending the strip about the remainder of the anvil and having means to receive the strip, and means whereby the sides of the strip may be made to first pass by the latter jaws and then be received by said jaws.

110. The combination of means for folding a metal strip lengthwise, an anvil, means for bending the strip transversely about a part of the anvil, two swinging jaws, reciprocatory means to which said jaws are held and adapted to be moved toward and away from the anvil, a swinging frame connected to one of said jaws, and means for moving said frame.

111. The combination of an anvil, means for bending a metal strip transversely about a part of the anvil, two swinging jaws, reciprocatory means to which said jaws are held and adapted to be moved toward and away from the anvil, a swinging frame connected to one of said jaws, and means for moving said frame.

112. The combination of means for folding a metal strip, an anvil, jaws for bending the strip partly about the anvil, jaws for bending the strip about the remainder of the anvil, and guides for the ends of the strip in its movement from the first-mentioned jaws to the second jaws.

113. The combination of means for supporting a metal strip, an anvil, means for bending the strip about a part of the anvil, two jaws for bending the strip about the remainder of the anvil, and means for reciprocating the jaws toward each other and against the anvil.

114. The combination of means for folding a metal strip lengthwise, an anvil, means for bending the strip partly about the anvil, a jaw for bending one end of the binding against the anvil, and a second jaw for bending the other end of the strip against the anvil, a cam plate to which the first-mentioned jaw is held, a pin carried by said jaw, a post projecting from the cam plate, and a pivoted frame connected to the post to move the latter and the jaw up and down.

115. The combination of means for folding a metal strip lengthwise, an anvil, means for bending the strip partly about the anvil, a jaw for bending one end of the binding about the anvil, and a second jaw for bending the other end of the strip against the anvil, a cam plate, a post projecting from the cam plate, and a pivoted frame connected to the post to move the latter and the jaw up and down.

116. The combination of an anvil, four jaws for bending a metal strip about the anvil, means for swinging the jaws horizontally, and means for giving an up-and-down movement to two of the jaws.

117. The combination of an anvil, means for bending a metal strip partly around the anvil, two jaws for bending the metal strip about the remaining sides of the anvil, a vertically movable carrier, means for pivotally holding one of the jaws to the carrier to have a relative independent movement, and means for applying the bent strip to an object to serve as a binding therefor.

118. The combination of an anvil, means for bending a metal strip partly around the anvil, two jaws for bending the metal strip about the remaining sides of the anvil, a vertically movable carrier, means for pivotally holding one of the jaws to the carrier to have a relative independent movement, and means for removing the bent strip from the anvil.

119. The combination of an anvil, clencher mechanism, jaws having a swinging movement and adapted to bend a metal strip about the anvil, and means whereby one of the jaws is given a vertical movement by engagement with a part carried by the clencher mechanism.

120. The combination of an anvil, means for bending a metal strip about the anvil and for overlapping the ends thereof, and a retaining pawl pivotally mounted in position to ride over the strip and drop down behind and hold the overlapped ends of the strip.

121. The combination of an anvil, means for bending a metal strip about the anvil and for overlapping the ends thereof, means for reforming one end of the strip before bending to cause the ends to lie substantially flush, and means adapted to hold the overlapped ends of the strip.

122. The combination of an anvil, means for bending a metal strip about the anvil and to cause the ends to overlap, a plate pivoted above the anvil and provided with a retaining finger, a spring normally forcing the plate in one direction, a latch pivotally supported and adapted to engage the plate, and means for releasing the latch.

123. The combination of an anvil, means for bending a metal strip about the anvil and to cause the ends to overlap, a retaining finger adapted to hold the overlapped ends after the completion of the bending operation, and means for releasing said finger.

124. The combination of means for bending a metal strip substantially rectangular, means for clenching the metal strip to an object, vertically movable stripper rods adapted to engage the binding, springs normally forcing the rods upward, dogs for holding the rods against the action of the springs, and means for automatically releasing the dogs.

125. The combination of means for bending a metal strip, means for clenching the metal strip to an object, vertically movable stripper rods adapted to engage the binding, and means for releasing said rods.

126. The combination of means for bending a metal strip lengthwise and transversely, means for clenching the metal strip to an object, vertically movable stripper rods adapted to engage the binding, springs normally forcing the rods upward, means for holding the rods against the action of the springs, and means for automatically releasing the rod holding means.

127. The combination of means for bending a metal strip substantially rectangular, means for clenching the metal strip to an object, and means for stripping said metal strip from the bending means.

This specification signed and witnessed this 11th day of November, A. D. 1912.

CHARLES BURNHAM.

Witnesses:
WM. H. BURNHAM,
R. W. KENNY.